United States Patent
Schmidtlin et al.

(10) Patent No.: US 11,486,970 B1
(45) Date of Patent: Nov. 1, 2022

(54) MULTIPLE BEAM GENERATION FROM A SINGLE SOURCE BEAM FOR USE WITH A LIDAR SYSTEM

(71) Applicant: INNOVUSION IRELAND LIMITED, Los Altos, CA (US)

(72) Inventors: Edouard Schmidtlin, San Francisco, CA (US); Rui Zhang, Palo Alto, CA (US)

(73) Assignee: Innovusion, Inc., Sunnyvale, CA (US)

(*) Notice: Subject to any disclaimer, the term of this patent is extended or adjusted under 35 U.S.C. 154(b) by 454 days.

(21) Appl. No.: 16/777,059

(22) Filed: Jan. 30, 2020

Related U.S. Application Data

(60) Provisional application No. 62/803,788, filed on Feb. 11, 2019.

(51) Int. Cl.
| | | |
|---|---|---|
| *G01C 3/08* | (2006.01) | |
| *G01S 7/481* | (2006.01) | |
| *G02B 27/14* | (2006.01) | |
| *G02B 27/12* | (2006.01) | |
| *G01S 17/06* | (2006.01) | |

(52) U.S. Cl.
CPC .......... *G01S 7/4814* (2013.01); *G01S 7/4817* (2013.01); *G01S 17/06* (2013.01); *G02B 27/126* (2013.01); *G02B 27/142* (2013.01)

(58) Field of Classification Search
CPC ...... G01S 7/4814; G01S 7/4817; G01S 17/06; G02B 27/126; G02B 27/142
USPC ...................................................... 356/5.01
See application file for complete search history.

(56) References Cited

U.S. PATENT DOCUMENTS

| | | |
|---|---|---|
| 5,006,721 A | 4/1991 | Cameron et al. |
| 5,546,188 A | 8/1996 | Wangler et al. |
| 5,793,491 A | 8/1998 | Wangler et al. |
| 5,838,239 A | 11/1998 | Stern et al. |
| 6,317,202 B1 | 11/2001 | Hosokawa et al. |
| 7,128,267 B2 | 10/2006 | Reichenbach et al. |
| 7,345,271 B2 | 3/2008 | Boehlau et al. |
| 8,994,928 B2 | 3/2015 | Shiraishi |
| 9,304,316 B2 | 4/2016 | Weiss et al. |
| 9,316,724 B2 | 4/2016 | Gehring et al. |
| 9,897,689 B2 | 2/2018 | Dussan |
| 10,042,159 B2 | 8/2018 | Dussan et al. |
| 10,061,019 B1 | 8/2018 | Campbell et al. |
| 10,073,166 B2 | 9/2018 | Dussan |
| 10,094,925 B1 | 10/2018 | LaChapelle |
| 10,191,155 B2 | 1/2019 | Curatu |
| 10,295,656 B1 | 5/2019 | Li et al. |
| 10,310,058 B1 | 6/2019 | Campbell et al. |
| 10,324,170 B1 | 6/2019 | Engberg, Jr. et al. |
| 10,324,185 B2 | 6/2019 | McWhirter et al. |
| 10,393,877 B2 | 8/2019 | Hall et al. |
| 10,429,495 B1 | 10/2019 | Wang et al. |
| 10,451,716 B2 | 10/2019 | Hughes et al. |
| 10,502,831 B2 | 12/2019 | Eichenholz |

(Continued)

FOREIGN PATENT DOCUMENTS

| | | |
|---|---|---|
| JP | 2007144667 A | 6/2007 |
| JP | 2010035385 A | 2/2010 |

*Primary Examiner* — Md M Rahman
(74) *Attorney, Agent, or Firm* — Mauriel Kapouytian Woods LLP; Liang Huang

(57) ABSTRACT

Embodiments discussed herein refer to generating multiple laser beams from a single beam source. Single source multi-beam splitters can produce multiple beams from a single source, precisely control the exit angle of each beam, and ensure that each beam has substantially the same intensity.

17 Claims, 33 Drawing Sheets

(56) References Cited

U.S. PATENT DOCUMENTS

| | | | |
|---|---|---|---|
| 10,571,567 B2 | 2/2020 | Campbell et al. |
| 10,578,720 B2 | 3/2020 | Hughes et al. |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,908,262 B2 | 2/2021 | Dussan |
| 10,983,218 B2 | 4/2021 | Hall et al. |
| 11,002,835 B2 | 5/2021 | Pan et al. |
| 2005/0190424 A1 | 9/2005 | Reichenbach et al. |
| 2005/0195383 A1 | 9/2005 | Breed et al. |
| 2018/0152691 A1 | 5/2018 | Pacala et al. |
| 2018/0188355 A1 | 7/2018 | Bao et al. |
| 2018/0210084 A1 | 7/2018 | Zwölfer et al. |
| 2018/0284286 A1 | 10/2018 | Eichenholz et al. |
| 2018/0329060 A1 | 11/2018 | Pacala et al. |
| 2018/0359460 A1 | 12/2018 | Pacala et al. |
| 2019/0107607 A1 | 4/2019 | Danziger |
| 2019/0107623 A1 | 4/2019 | Campbell et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0250254 A1 | 8/2019 | Campbell et al. |
| 2019/0277952 A1 | 9/2019 | Beuschel et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0088630 A9 | 3/2021 | Zhang |

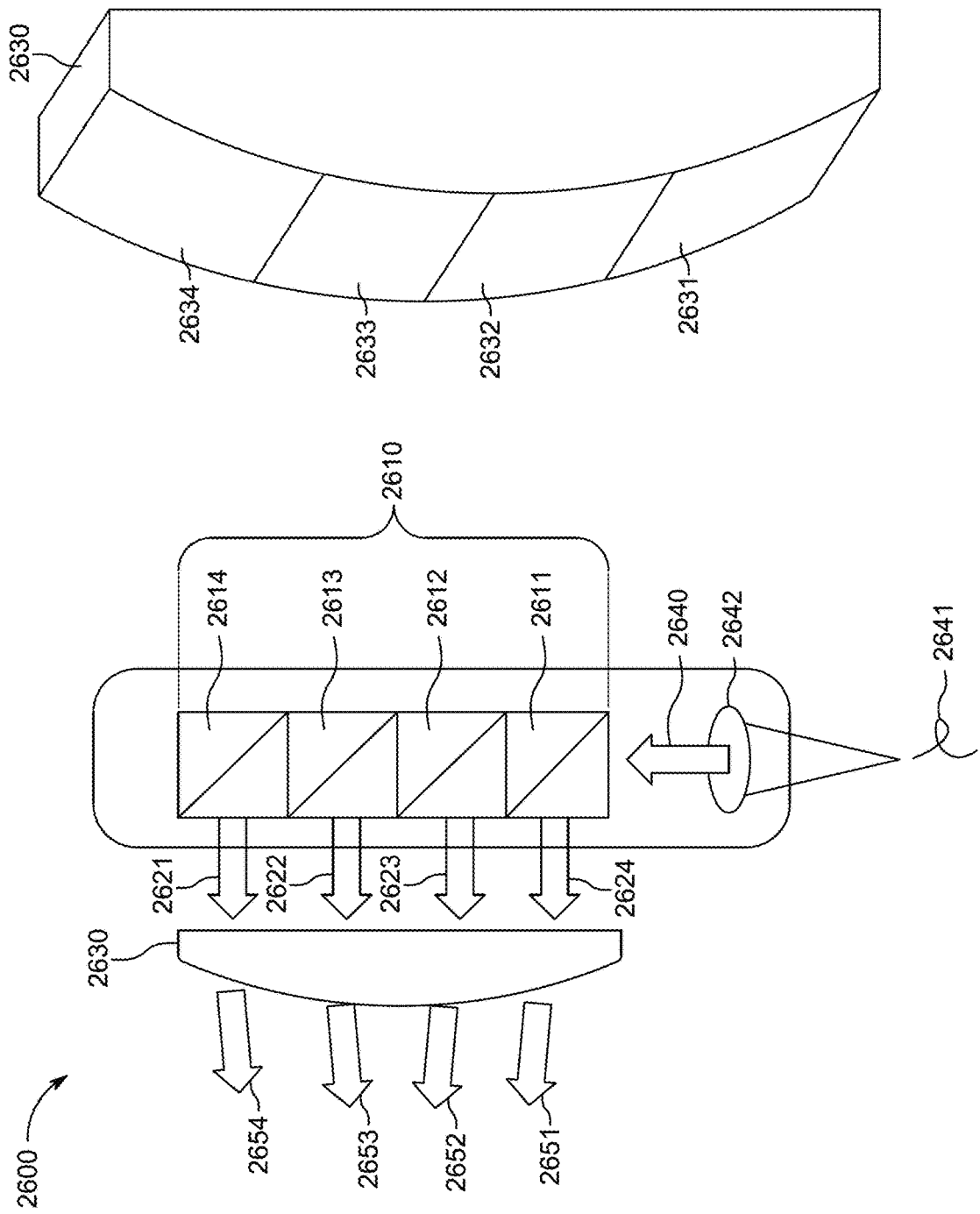

US 11,486,970 B1

MULTIPLE BEAM GENERATION FROM A SINGLE SOURCE BEAM FOR USE WITH A LIDAR SYSTEM

This application claims the benefit of U.S. Provisional Application No. 62/803,788, filed Feb. 11, 2019, the disclosure of which is incorporated herein in its entirety.

FIELD OF THE INVENTION

The present disclosure relates generally to laser scanning and, more particularly, to using a generating multiple laser beams from a single beam source.

BACKGROUND

Systems exist that enable vehicles to be driven semi-autonomously or fully autonomously. Such systems may use one or more range finding, mapping, or object detection systems to provide sensory input to assist in semi-autonomous or fully autonomous vehicle control. Light detection and ranging (LiDAR) systems, for example, can provide the sensory input required by a semi-autonomous or fully autonomous vehicle. LiDAR systems use light pulses to create an image or point cloud of the external environment. Some typical LiDAR systems include a light source, a pulse steering system, and light detector. The light source generates light pulses that are directed by the pulse steering system in particular directions when being transmitted from the LiDAR system. When a transmitted light pulse is scattered by an object, some of the scattered light is returned to the LiDAR system as a returned pulse. The light detector detects the returned pulse. Using the time it took for the returned pulse to be detected after the light pulse was transmitted and the speed of light, the LiDAR system can determine the distance to the object along the path of the transmitted light pulse. The pulse steering system can direct light pulses along different paths to allow the LiDAR system to scan the surrounding environment and produce an image or point cloud. LiDAR systems can also use techniques other than time-of-flight and scanning to measure the surrounding environment

BRIEF SUMMARY

Embodiments discussed herein refer to generating multiple laser beams from a single beam source by using a single source, multi-beam (SSMB) splitter. SSMB splitters according to embodiments discussed herein can produce multiple beams from a single source, precisely control the exit angle of each beam, and ensure that each beam has substantially the same intensity.

In one embodiment, a wedge splitter for use with a light detection and ranging (LiDAR) system is provided that includes a prism structure that includes a beam injection portion for receiving a light beam at an angle of incidence (AOI); a first planar surface arranged at a first relative angle; and a second planar surface arrange at a second relative angle that differs from the first relative angle by a wedge angle. The wedge splitter includes a plurality of beam intensity equalizing portions disposed on the prism structure, wherein the prism structure emits a plurality of output beams that are derived from the received light beam via the plurality of beam intensity equalizing portions, wherein the AOI and the wedge angle control an output angle of each of the plurality output beams such that each of the plurality output beams converge at a common point in space a fixed distance away from the wedge splitter, and wherein each of the plurality of beam intensity equalizing portions control a respective reflectivity/transmissivity ratio to ensure that each of the plurality output beams has a substantially similar intensity.

In one embodiment, the output angle of each of the plurality output beams is such that an inter-beam angle between adjacent output beams of the plurality of output beams is the same.

In one embodiment, the inter-beam angle is 1.12 degrees.

In one embodiment, the plurality output beams comprises four output beams.

In one embodiment, the prism structure is a trapezoidal prism.

In one embodiment, the second planar surface comprises a mirror coating.

In one embodiment, each of the plurality of beam intensity equalizing portions comprises a dielectric layer or a metal layer.

In one embodiment, the wedge angle ranges between 0.3 degrees and 0.7 degrees.

In one embodiment, the first and second planar surfaces are not parallel.

In one embodiment, a single source multiple beam (SSMB) splitter includes a monolithic structure operative to receive a single input beam and output a plurality of output beams by controlling an internal reflection path of the single input beam and output angles for each of the output beams such that the output beams have substantially the same beam intensity and convergence point.

In one embodiment, the monolithic structure includes first and second planar surfaces that differ in respective relative angles by a wedge angle that is, at least in part, responsible for controlling the internal reflection path and exit angles of each of the output beams.

In one embodiment, the monolithic structure includes a plurality of discreet beam intensity equalizing portions that control the beam intensity of the plurality of output beams.

In one embodiment, the monolithic structure includes a continuously variable beam intensity equalizing layer that controls the beam intensity of the plurality of output beams.

In one embodiment, the output angle of each of the plurality output beams is such that an inter-beam angle between adjacent output beams is the same.

In one embodiment, the monolithic structure is a trapezoidal prism.

In one embodiment, a single source multiple beam (SSMB) splitter includes a stacked splitter array configured to receive a light beam, the stacked splitter array comprising a plurality of prism structures that provide a plurality of interstitial light beams based on the received light beam, wherein the plurality of interstitial light beams are redirected at the same interstitial beam angle and beam intensity, and a faceted deflector that provides a plurality of output beams based on the interstitial light beams by redirecting each of the plurality of interstitial light beams along respective output angles.

In one embodiment, the plurality of output beams are substantially equal in intensity and converge at the same point a fixed distance away from the SSMB splitter.

In one embodiment, the SSMB splitter further includes a divergence lens that partially diverges the light beam before it is received by the stacked splitter array.

In one embodiment, the faceted deflector includes a planoconvex lens.

In one embodiment, a LiDAR system is provided that includes a beam steering system, which includes a polygon structure, and a mirror coupled to a mirror controller that controls movement speed and direction of the mirror. The LiDAR system includes a laser subsystem including a laser source and a single source multiple beam (SSMB) splitter that produces a plurality of output beams that are steered by the beam steering system in accordance with a field of view (FOV), and a region of interest (ROI) controller coupled to the beam steering system and the laser subsystem, the ROI controller operative to coordinate the movement speed of the mirror and light pulse intervals when the light pulses emitted by the laser system are steered to at least one ROI within the FOV.

In one embodiment, the plurality of output beams are substantially equal in intensity and have the same inter-beam angle.

In one embodiment, the ROI controller is operative to control the mirror movement speed based on the inter-beam angle, a frame rate in which the beam steering system scans the FOV, and the at least one ROI.

In one embodiment, the ROI controller is operative to control the mirror movement speed based on a desired angular resolution.

In one embodiment, the SSMB splitter comprises a monolithic structure operative to receive a single input beam and output the plurality of output beams by controlling an internal reflection path of the single input beam and output angles for each of the output beams such that the output beams have substantially the same beam intensity and convergence point In one embodiment, the ROI controller is operative to, for light pulses steered towards the at least one ROI, control the movement speed of the mirror such that it is slower compared to the movement speed of the mirror when the light pulses are steered towards a non-ROI.

In one embodiment, the ROI controller is operative to adjust the movement speed of the mirror based on a beam steering angle within the FOV.

In one embodiment, the ROI controller is operative to adjust a repetition rate of the light pulses based on the beam steering angle.

A further understanding of the nature and advantages of the embodiments discussed herein may be realized by reference to the remaining portions of the specification and the drawings.

BRIEF DESCRIPTION OF THE DRAWINGS

FIG. 26A shows illustrative splitter according to an embodiment.

FIG. 26B shows illustrative faceted deflector according to an embodiment.

DETAILED DESCRIPTION

Figure 1:
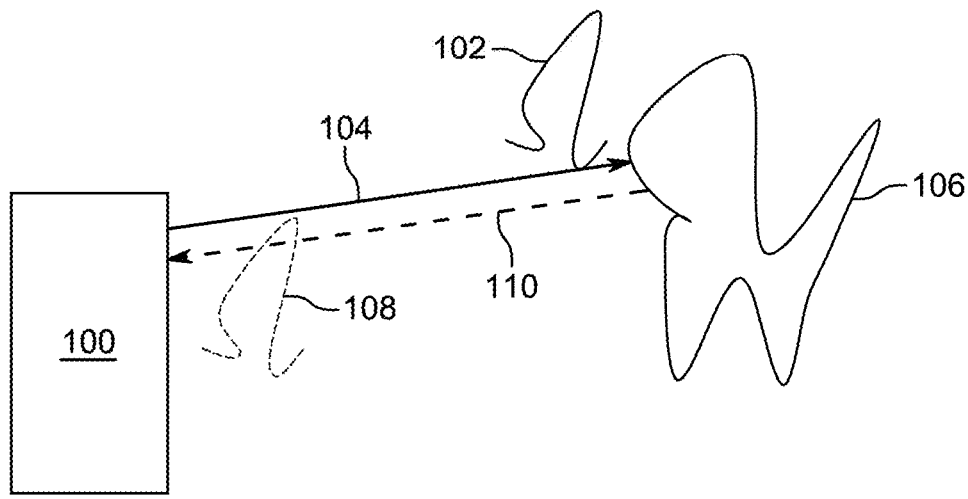
FIGS. 1, 2, and 3 illustrate an exemplary LiDAR system using pulse signal to measure distances to points in the outside environment.

Illustrative embodiments are now described more fully hereinafter with reference to the accompanying drawings, in which representative examples are shown. Indeed, the disclosed LiDAR systems and methods may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Some light detection and ranging (LiDAR) systems use a single light source to produce one or more light signals of a single wavelength that scan the surrounding environment. The signals are scanned using steering systems that direct the pulses in one or two dimensions to cover an area of the surrounding environment (the scan area). When these systems use mechanical means to direct the pulses, the system complexity increases because more moving parts are required. Additionally, only a single signal can be emitted at any one time because two or more identical signals would introduce ambiguity in returned signals. In some embodiments of the present technology, these disadvantages and/or others are overcome.

For example, some embodiments of the present technology use one or more light sources that produce light signals of different wavelengths and/or along different optical paths. These light sources provide the signals to a signal steering system at different angles so that the scan areas for the light signals are different (e.g., if two light sources are used to create two light signals, the scan area associated with each light source is different). This allows for tuning the signals to appropriate transmit powers and the possibility of having overlapping scan areas that cover scans of different distances. Longer ranges can be scanned with signals having higher power and/or slower repetition rate (e.g., when using pulsed light signals). Shorter ranges can be scanned with signals having lower power and/or high repetition rate (e.g., when using pulse light signals) to increase point density.

As another example, some embodiments of the present technology use signal steering systems with one or more dispersion elements (e.g., gratings, optical combs, prisms, etc.) to direct pulse signals based on the wavelength of the pulse. A dispersion element can make fine adjustments to a pulse's optical path, which may be difficult or impossible with mechanical systems. Additionally, using one or more dispersion elements allows the signal steering system to use few mechanical components to achieve the desired scanning capabilities. This results in a simpler, more efficient (e.g., lower power) design that is potentially more reliable (due to few moving components).

Some LiDAR systems use the time-of-flight of light signals (e.g., light pulses) to determine the distance to objects in the path of the light. For example, with respect to FIG. 1, an exemplary LiDAR system 100 includes a laser light source (e.g., a fiber laser), a steering system (e.g., a system of one or more moving mirrors), and a light detector (e.g., a photon detector with one or more optics). LiDAR system 100 transmits light pulse 102 along path 104 as determined by the steering system of LiDAR system 100. In the depicted example, light pulse 102, which is generated by the laser light source, is a short pulse of laser light. Further, the signal steering system of the LiDAR system 100 is a pulse signal steering system. However, it should be appreciated that LiDAR systems can operate by generating, transmitting, and detecting light signals that are not pulsed can be used to derive ranges to object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulses also may be applicable to LiDAR systems that do not use one or both of these techniques.

Referring back to FIG. 1 (a time-of-flight LiDAR system that uses light pulses) when light pulse 102 reaches object 106, light pulse 102 scatters and returned light pulse 108 will be reflected back to system 100 along path 110. The time from when transmitted light pulse 102 leaves LiDAR system 100 to when returned light pulse 108 arrives back at LiDAR system 100 can be measured (e.g., by a processor or other electronics within the LiDAR system). This time-of-flight combined with the knowledge of the speed of light can be used to determine the range/distance from LiDAR system 100 to the point on object 106 where light pulse 102 scattered.

Figure 2:
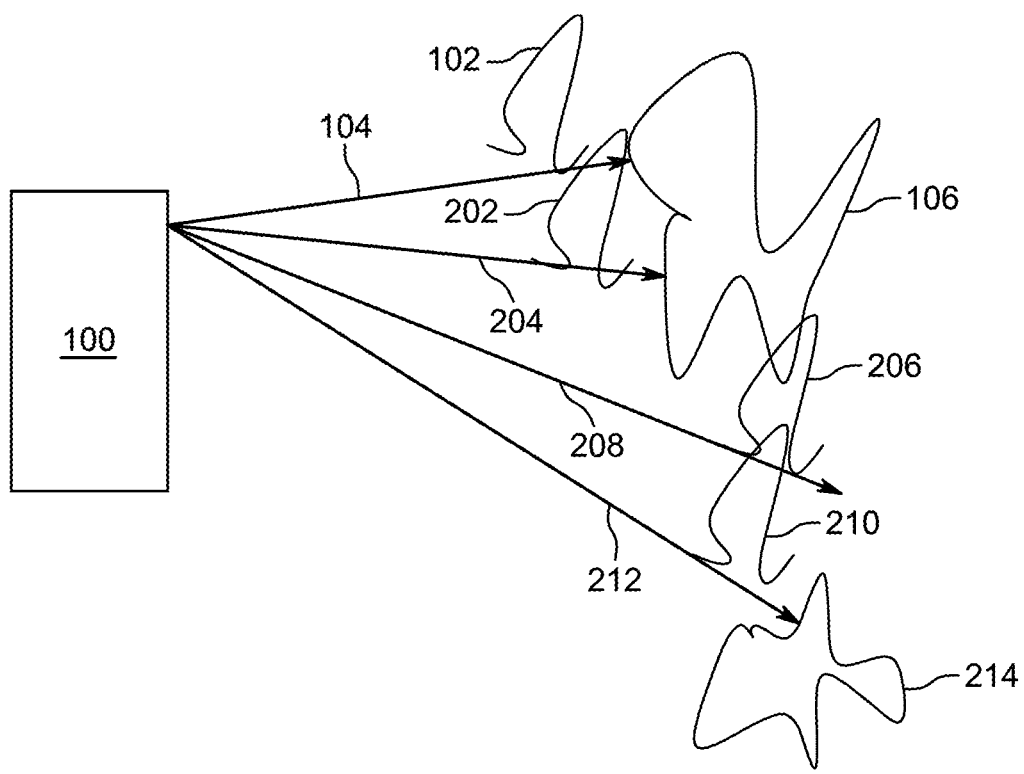
Figure 3:
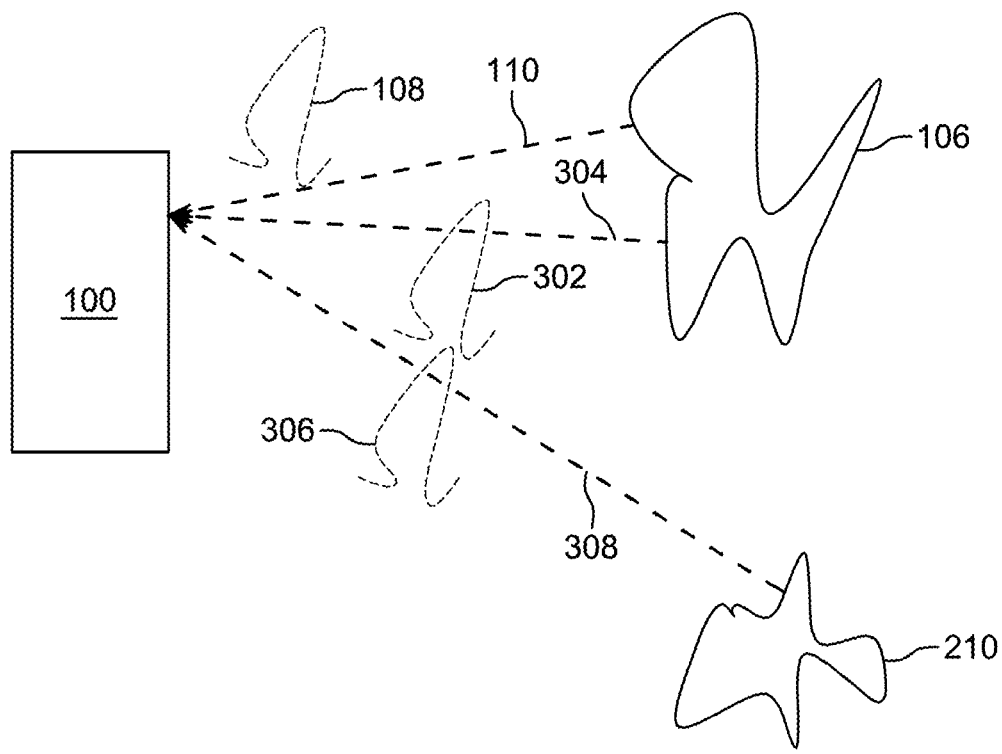

By directing many light pulses, as depicted in FIG. 2, LiDAR system 100 scans the external environment (e.g., by directing light pulses 102, 202, 206, 210 along paths 104, 204, 208, 212, respectively). As depicted in FIG. 3, LiDAR system 100 receives returned light pulses 108, 302, 306 (which correspond to transmitted light pulses 102, 202, 210, respectively) back after objects 106 and 214 scatter the transmitted light pulses and reflect pulses back along paths 110, 304, 308, respectively. Based on the direction of the transmitted light pulses (as determined by LiDAR system 100) as well as the calculated range from LiDAR system 100 to the points on objects that scatter the light pulses (e.g., the points on objects 106 and 214), the surroundings within the detection range (e.g., the field of view between path 104 and 212, inclusively) can be precisely plotted (e.g., a point cloud or image can be created).

If a corresponding light pulse is not received for a particular transmitted light pulse, then it can be determined that there are no objects that can scatter sufficient amount of signal for the LiDAR light pulse within a certain range of LiDAR system 100 (e.g., the max scanning distance of LiDAR system 100). For example, in FIG. 2, light pulse 206 will not have a corresponding returned light pulse (as depicted in FIG. 3) because it did not produce a scattering event along its transmission path 208 within the predetermined detection range. LiDAR system 100 (or an external system communication with LiDAR system 100) can interpret this as no object being along path 208 within the detection range of LiDAR system 100.

In FIG. 2, transmitted light pulses 102, 202, 206, 210 can be transmitted in any order, serially, in parallel, or based on other timings with respect to each other. Additionally, while FIG. 2 depicts a 1-dimensional array of transmitted light pulses, LiDAR system 100 optionally also directs similar arrays of transmitted light pulses along other planes so that a 2-dimensional array of light pulses is transmitted. This 2-dimensional array can be transmitted point-by-point, line-by-line, all at once, or in some other manner. The point cloud or image from a 1-dimensional array (e.g., a single horizontal line) will produce 2-dimensional information (e.g., (1) the horizontal transmission direction and (2) the range to objects). The point cloud or image from a 2-dimensional array will have 3-dimensional information (e.g., (1) the horizontal transmission direction, (2) the vertical transmission direction, and (3) the range to objects).

The density of points in point cloud or image from a LiDAR system 100 is equal to the number of pulses divided by the field of view. Given that the field of view is fixed, to increase the density of points generated by one set of transmission-receiving optics, the LiDAR system should fire a pulse more frequently, in other words, a light source with a higher repetition rate is needed. However, by sending pulses more frequently the farthest distance that the LiDAR system can detect may be more limited. For example, if a returned signal from a far object is received after the system transmits the next pulse, the return signals may be detected in a different order than the order in which the corresponding signals are transmitted and get mixed up if the system cannot correctly correlate the returned signals with the transmitted signals. To illustrate, consider an exemplary LiDAR system that can transmit laser pulses with a repetition rate between 500 kHz and 1 MHz. Based on the time it takes for a pulse to return to the LiDAR system and to avoid mix-up of returned pulses from consecutive pulses in conventional LiDAR design, the farthest distance the LiDAR system can detect may be 300 meters and 150 meters for 500 kHz and 1 Mhz, respectively. The density of points of a LiDAR system with 500 kHz repetition rate is half of that with 1 MHz. Thus, this example demonstrates that, if the system cannot correctly correlate returned signals that arrive out of order, increasing the repetition rate from 500 kHz to 1 Mhz (and thus improving the density of points of the system) would significantly reduce the detection range of the system.

Figure 4:
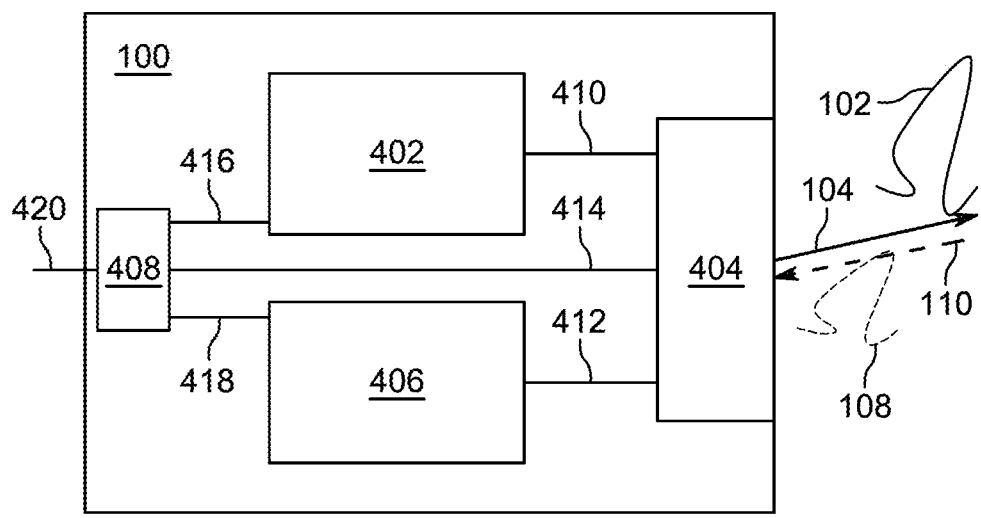
FIG. 4 depicts a logical block diagram of the exemplary LiDAR system.

FIG. 4 depicts a logical block diagram of LiDAR system 100, which includes light source 402, signal steering system 404, pulse detector 406, and controller 408. These components are coupled together using communications paths 410, 412, 414, 416, and 418. These communications paths represent communication (bidirectional or unidirectional) among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one exemplary LiDAR system, communication path 410 is one or more optical fibers, communication path 412 represents an optical path, and communication paths 414, 416, 418, and 420 are all one or more electrical wires that carry electrical signals. The communications paths can also include more than one of the above types of communication mediums (e.g., they can include an optical fiber and an optical path or one or more optical fibers and one or more electrical wires).

LiDAR system 100 can also include other components not depicted in FIG. 4, such as power buses, power supplies, LED indicators, switches, etc. Additionally, other connections among components may be present, such as a direct connection between light source 402 and light detector 406 so that light detector 406 can accurately measure the time from when light source 402 transmits a light pulse until light detector 406 detects a returned light pulse.

Figure 5:
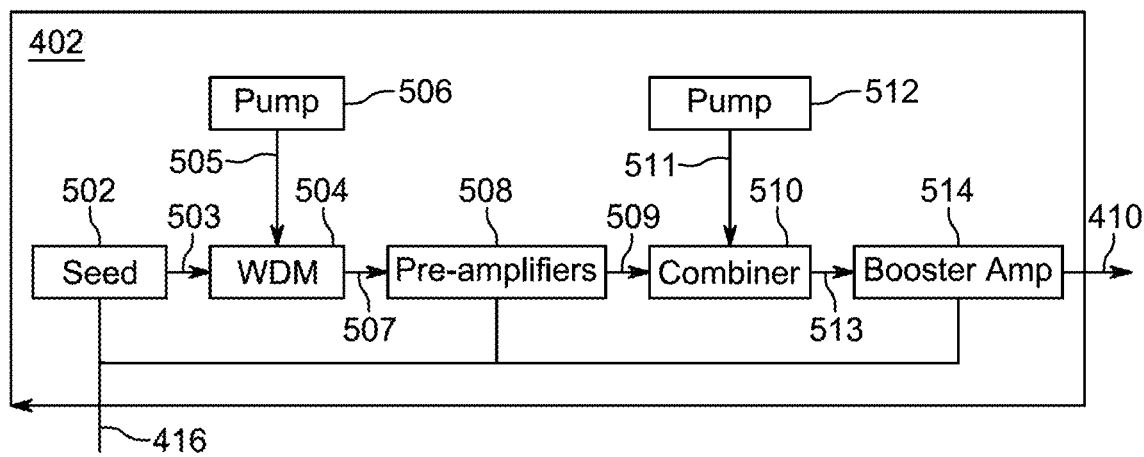
FIG. 5 depicts a light source of the exemplary LiDAR system.

FIG. 5 depicts a logical block diagram of one example of light source 402 that is based on a fiber laser, although any number of light sources with varying architecture could be used as part of the LiDAR system. Light source 402 uses seed 502 to generate initial light pulses of one or more wavelengths (e.g., 1550 nm), which are provided to wavelength-division multiplexor (WDM) 504 via fiber 503. Pump 506 also provides laser power (of a different wavelength, such as 980 nm) to WDM 504 via fiber 505. The output of WDM 504 is provided to pre-amplifiers 508 (which includes one or more amplifiers) which provides its output to combiner 510 via fiber 509. Combiner 510 also takes laser power from pump 512 via fiber 511 and provides pulses via fiber 513 to booster amplifier 514, which produces output light pulses on fiber 410. The outputted light pulses are then fed to steering system 404. In some variations, light source 402 can produce pulses of different amplitudes based on the fiber gain profile of the fiber used in the source. Communication path 416 couples light source 402 to controller 408 (FIG. 4) so that components of light source 402 can be controlled by or otherwise communicate with controller 408. Alternatively, light source 402 may include its own controller. Instead of controller 408 communicating directly with components of light source 402, a dedicated light source controller communicates with controller 408 and controls and/or communicates with the components of light source 402. Light source 402 also includes other components not shown, such as one or more power connectors, power supplies, and/or power lines.

Some other light sources include one or more laser diodes, short-cavity fiber lasers, solid-state lasers, and/or tunable external cavity diode lasers, configured to generate one or more light signals at various wavelengths. In some examples, light sources use amplifiers (e.g., pre-amps or booster amps) include a doped optical fiber amplifier, a solid-state bulk amplifier, and/or a semiconductor optical amplifier, configured to receive and amplify light signals.

Returning to FIG. 4, signal steering system 404 includes any number of components for steering light signals generated by light source 402. In some examples, signal steering system 404 may include one or more optical redirection elements (e.g., mirrors or lens) that steer light pulses (e.g., by rotating, vibrating, or directing) along a transmit path to scan the external environment. For example, these optical redirection elements may include MEMS mirrors, rotating polyhedron mirrors, or stationary mirrors to steer the transmitted pulse signals to different directions. Signal steering system 404 optionally also includes other optical components, such as dispersion optics (e.g., diffuser lenses, prisms, or gratings) to further expand the coverage of the transmitted signal in order to increase the LiDAR system 100's transmission area (i.e., field of view). An example signal steering system is described in U.S. patent application Ser. No. 15/721,127 filed on Sep. 29, 2017, entitled "2D Scanning High Precision LiDAR Using Combination of Rotating Concave Mirror and Beam Steering Devices," the content of which is incorporated by reference in its entirety herein for all purposes. In some examples, signal steering system 404 does not contain any active optical components (e.g., it does not contain any amplifiers). In some other examples, one or more of the components from light source 402, such as a booster amplifier, may be included in signal steering system 404. In some instances, signal steering system 404 can be considered a LiDAR head or LiDAR scanner.

Some implementations of signal steering systems include one or more optical redirection elements (e.g., mirrors or lens) that steers returned light signals (e.g., by rotating, vibrating, or directing) along a receive path to direct the returned light signals to the light detector. The optical redirection elements that direct light signals along the transmit and receive paths may be the same components (e.g., shared), separate components (e.g., dedicated), and/or a combination of shared and separate components. This means that in some cases the transmit and receive paths are different although they may partially overlap (or in some cases, substantially overlap).

Figure 6:
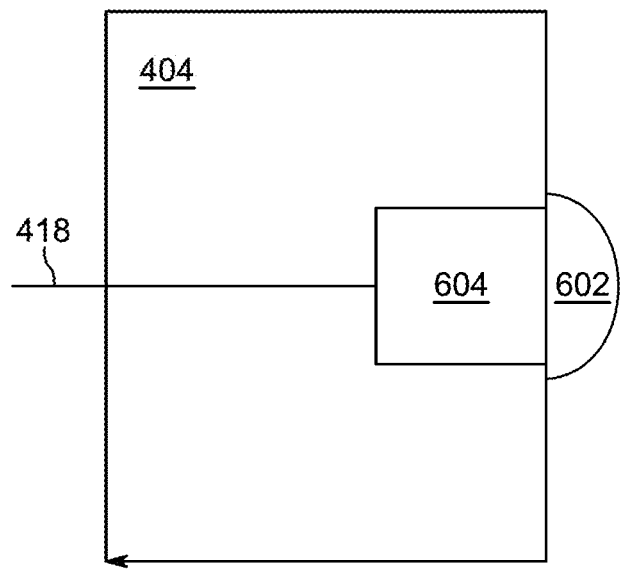
FIG. 6 depicts a light detector of the exemplary LiDAR system.

FIG. 6 depicts a logical block diagram of one possible arrangement of components in light detector 404 of LiDAR system 100 (FIG. 4). Light detector 404 includes optics 604 (e.g., a system of one or more optical lenses) and detector 602 (e.g., a charge coupled device (CCD), a photodiode, an avalanche photodiode, a photomultiplier vacuum tube, an image sensor, etc.) that is connected to controller 408 (FIG. 4) via communication path 418. The optics 604 may include one or more photo lenses to receive, focus, and direct the returned signals. Light detector 404 can include filters to selectively pass light of certain wavelengths. Light detector 404 can also include a timing circuit that measures the time from when a pulse is transmitted to when a corresponding returned pulse is detected. This data can then be transmitted to controller 408 (FIG. 4) or to other devices via communication line 418. Light detector 404 can also receive information about when light source 402 transmitted a light pulse via communication line 418 or other communications lines that are not shown (e.g., an optical fiber from light source 402 that samples transmitted light pulses). Alternatively, light detector 404 can provide signals via communication line 418 that indicate when returned light pulses are detected. Other pulse data, such as power, pulse shape, and/or wavelength, can also be communicated.

Returning to FIG. 4, controller 408 contains components for the control of LiDAR system 100 and communication with external devices that use the system. For example, controller 408 optionally includes one or more processors, memories, communication interfaces, sensors, storage devices, clocks, ASICs, FPGAs, and/or other devices that control light source 402, signal steering system 404, and/or light detector 406. In some examples, controller 408 controls the power, rate, timing, and/or other properties of light signals generated by light source 402; controls the speed, transmit direction, and/or other parameters of light steering system 404; and/or controls the sensitivity and/or other parameters of light detector 406.

Controller 408 optionally is also configured to process data received from these components. In some examples, controller determines the time it takes from transmitting a light pulse until a corresponding returned light pulse is received; determines when a returned light pulse is not received for a transmitted light pulse; determines the transmitted direction (e.g., horizontal and/or vertical information) for a transmitted/returned light pulse; determines the estimated range in a particular direction; and/or determines any other type of data relevant to LiDAR system 100.

Figure 7:
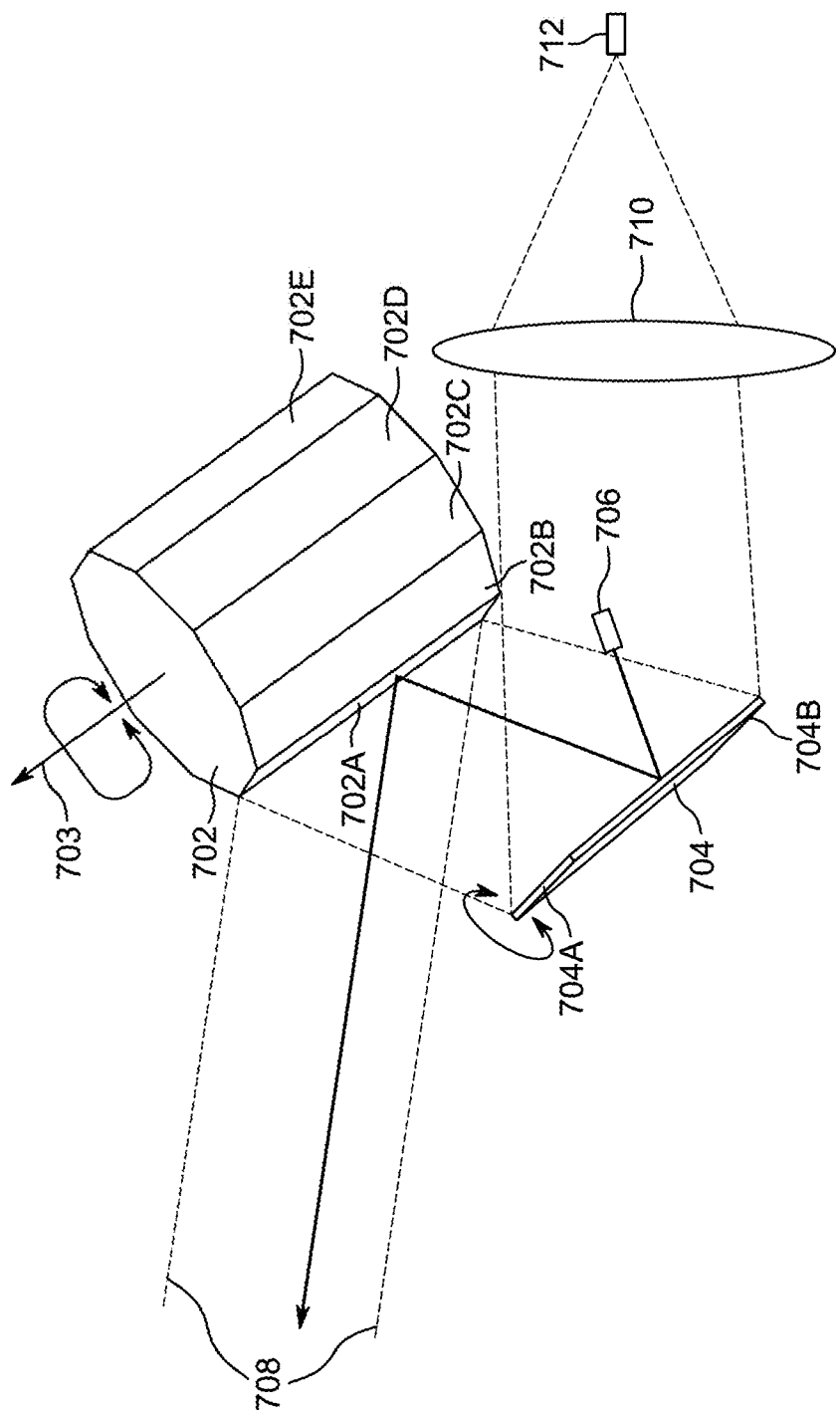
FIG. 7 depicts an embodiment of a signal steering system using a single light source and detector.

FIG. 7 depicts an embodiment of a signal steering system (e.g., signal steering system 404 of FIG. 4) according to some embodiments of the present technology. Polygon 702 has ten reflective sides (sides 702A-702E are visible in FIG. 7) but can have any number of reflective sides. For example, other examples of polygon 702 has 6, 8, or 20 sides. Polygon 702 rotates about axis 703 based on a drive motor (not shown) to scan signals delivered from a light source (e.g., via output 706, which is connected to a light source such as light source 402 described above) along a direction perpendicular or at a non-zero angle to axis of rotation 703.

Mirror galvanometer 704 is positioned next to polygon 702 so that one or more signals emitted from light source output 706 (e.g., a fiber tip) reflect off of mirror galvanometer 704 and onto rotating polygon 702. Mirror galvanometer 704 can sometimes be referred to as a galvo. Mirror galvanometer 704 tilts so as to scan one or more signals from output 706 to a direction different than the direction that polygon 702 scans signals (e.g., edges 704A and 704B tilt towards and away from polygon 702 about axis so as to scan pulses along a path that is parallel or at an angle to the axis of rotation of polygon 702). In some examples, polygon 702 is responsible for scanning one or more signals in the horizontal direction of the LiDAR system and mirror galvanometer 704 is responsible for scanning one or more signals in the vertical direction. In some other examples, polygon 702 and mirror galvanometer 704 are configured in the reverse manner. While the example in FIG. 7 uses a mirror galvanometer, other components can be used in its place. For example, one or more rotating mirrors or a grating (with different wavelength pulses) may be used. The solid black line represents one example signal path through the signal steering system.

Light returned from signal scattering (e.g., when a light hits an object) within region 708 (indicated by dashed lines) is returned to rotating polygon 702, reflected back to mirror galvanometer 704, and focused by lens 710 onto detector 712. While lens 710 is depicted as a single lens, in some variations it is a system of one or more optics.

Figure 8:
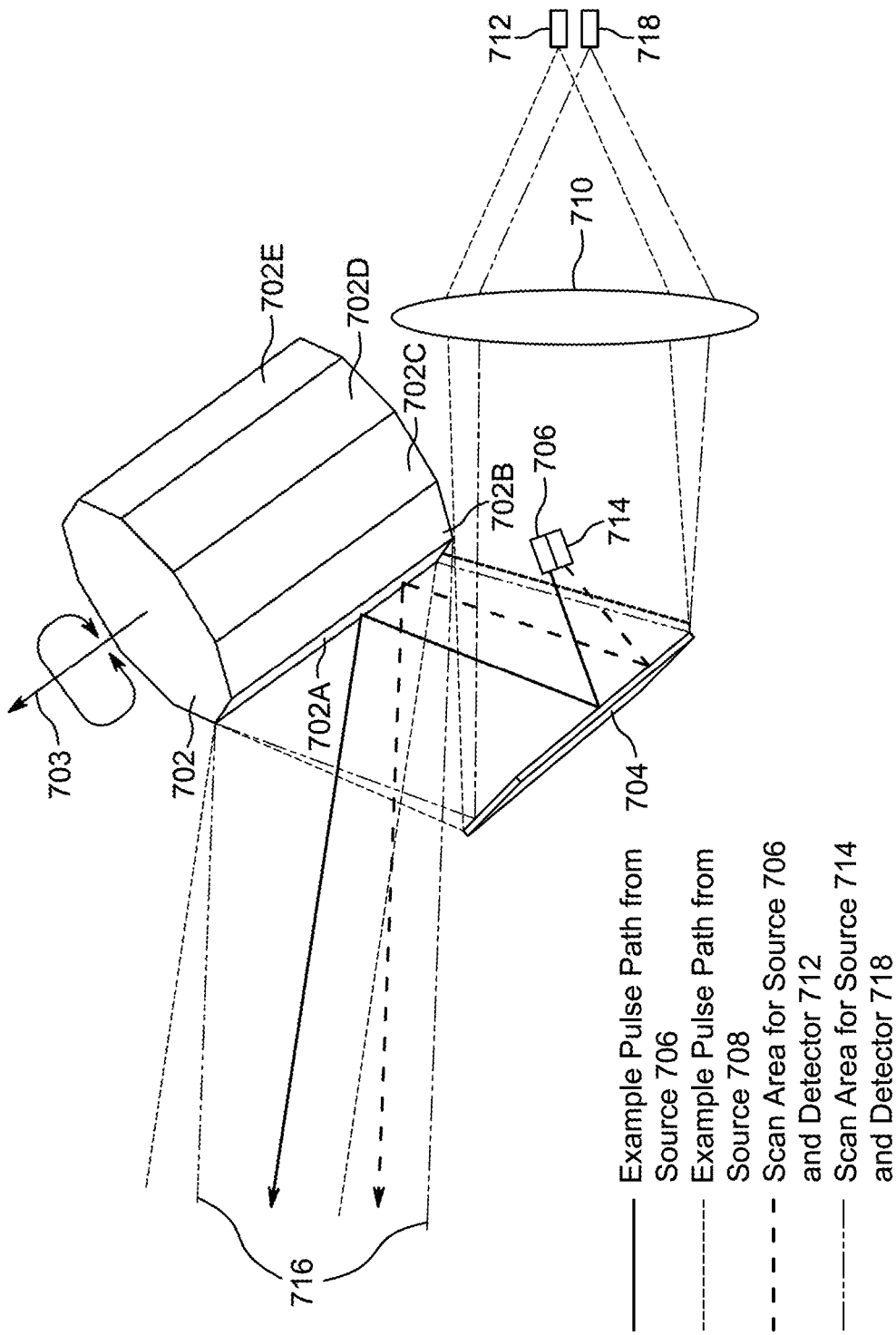
FIG. 8 depicts an embodiment of a signal steering system using two light sources and two detectors.

FIG. 8 depicts a similar system as depicted in FIG. 7 except a second light source is added that provides one or more signals from output 714. The light source for output 714 may be the same or different than the light source for output 706, and the light transmitted by output 714 may have the same or a different wavelength as the light transmitted by output 706. Using multiple light outputs can increase the points density of a points map without sacrificing the maximum unambiguous detection range of the system. For example, light output 714 can be positioned to transmit light at a different angle from output 706. Because of the different angles, light transmitted from light source 706 is directed to an area different from light transmitted from output 714. The dotted line shows one example pulse path for pulses emitted from output 714. Consequently, one or more objects located at two different areas within a region can scatter and return light to the LiDAR system. For example, the region 716 (the dashed/double-dotted line) indicates the region from which return signals from scattered signals returns to the LiDAR system. The returned light is reflected off polygon 702 and mirror galvanometer 704 and focused on detectors 712 and 718 by lens 710. Detectors 712 and 718 can each be configured to receive returned light from one of the outputs 706 and 714, and such configuration can be achieved by precisely controlling the position of the detectors 712 and 718 as well as the wavelength(s) of the transmitted light. Note that the same lens (or optic system) can be used for both detector 712 and 718. The offset between outputs 706 and 714 means that the light returned to the LiDAR system will have a similar offset. By properly positioning detectors 712 and 718 based on the relative positioning of their respective light source outputs (e.g., respective positions of outputs 706 and 714) and, optionally, by properly controlling the wavelength(s) of the transmitted light, the returned light will be properly focused on to the correct detectors, and each received light can be a point in the points map. Therefore, compare to the system with only one output 706, the system with two outputs can maintain the same pulse repetition rate and produce twice the number of points or reduce the pulse repetition rate by half and still produce the same number of points. As a non-limiting example, a system with two light outputs can reduce the pulse repetition rate from 1 MHz to 500 KHz, thereby increasing its maximum unambiguous detection range from 150 meters to 300 meters, without sacrificing points density of the resulting points map. A pulse repetition rate of between 200 and 2 MHz is contemplated and disclosed.

Figure 9:
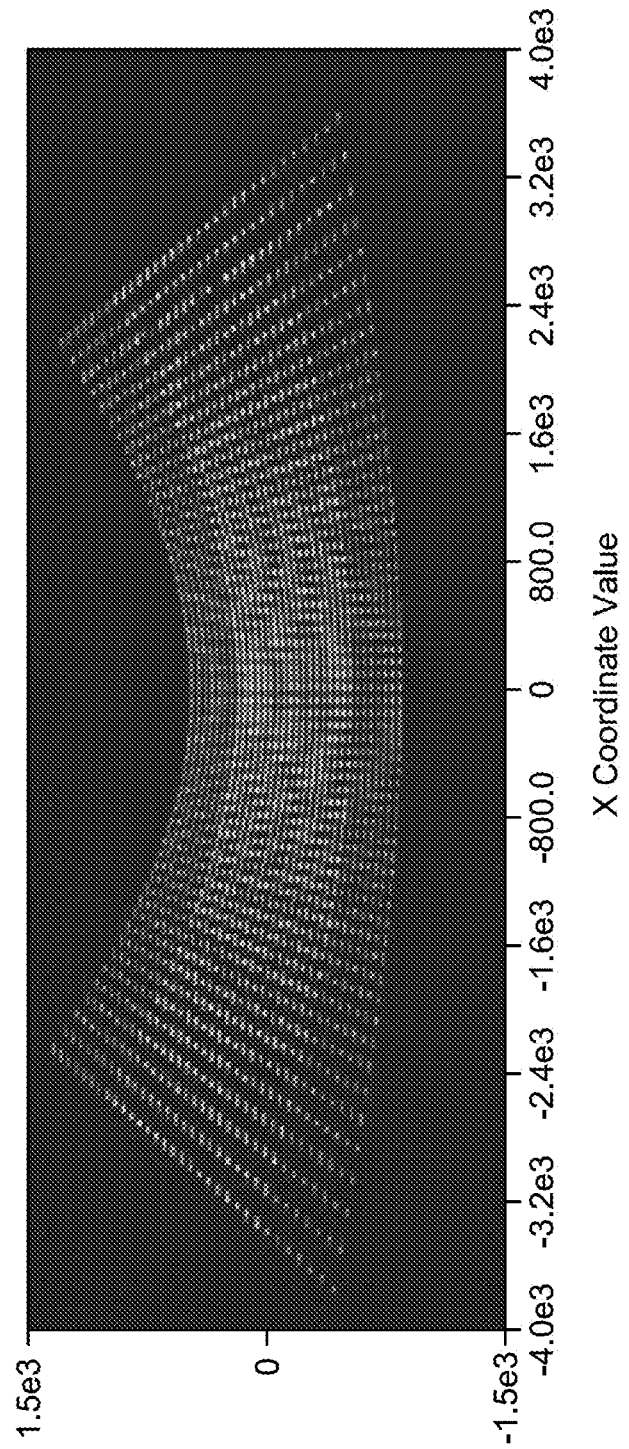
FIG. 9 depicts a portion of the scan pattern generated by the embodiment from FIG. 8.

FIG. 9 depicts a point map from a first design. This design has two channels (e.g., two light source outputs and two light detectors) placed in a way that the exiting beams have an angle of 8 degrees vertically. The scanned pattern has vertical overlap. The scanned range is +−56 degrees horizontally and +12~−20 degrees vertically.

Figure 10:
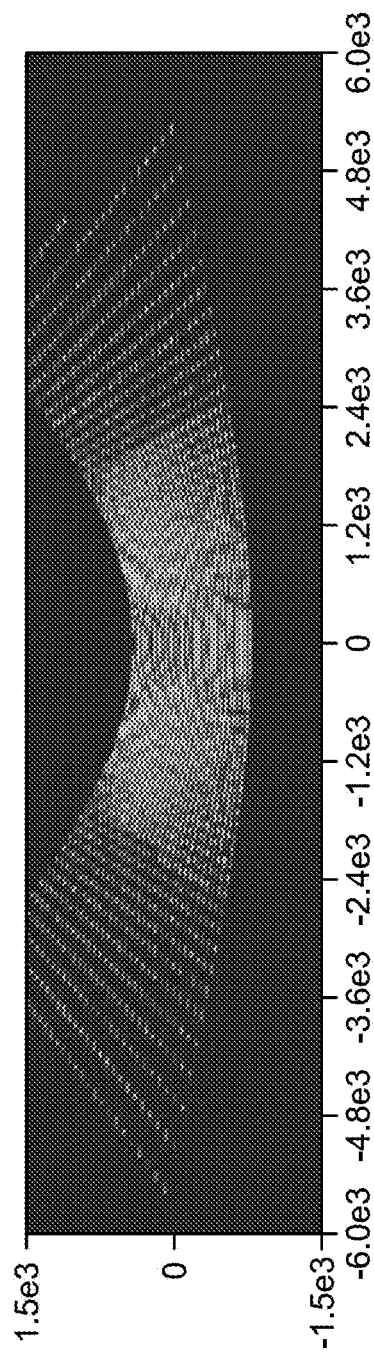
FIG. 10 depicts a portion of the scan pattern according to another embodiment.

FIG. 10 depicts a point map from a second design. This design has two channels (e.g., two light source outputs and two light detectors) placed in a way that the exiting beams have an angle of 6 degrees. The scanned pattern has horizontal overlap (+−45 degrees). The scanned range is +−67 degrees horizontally and +12~−20 degrees vertically.

Exiting beams of two channels are not necessary to separate with a certain angle (e.g. 6 degree in FIG. 10) to obtain a larger horizontal range. Horizontal displacement of existing beams can be used to expand the horizontal range. For example, two exit beams may be pointed that same angle, but are offset with respect to each other in the same plane. Due to these different positions, each channel is reflected by different part of polygon and therefore covers a different horizontal range. By combining the two channels, the total horizontal range is increased.

Figure 11:
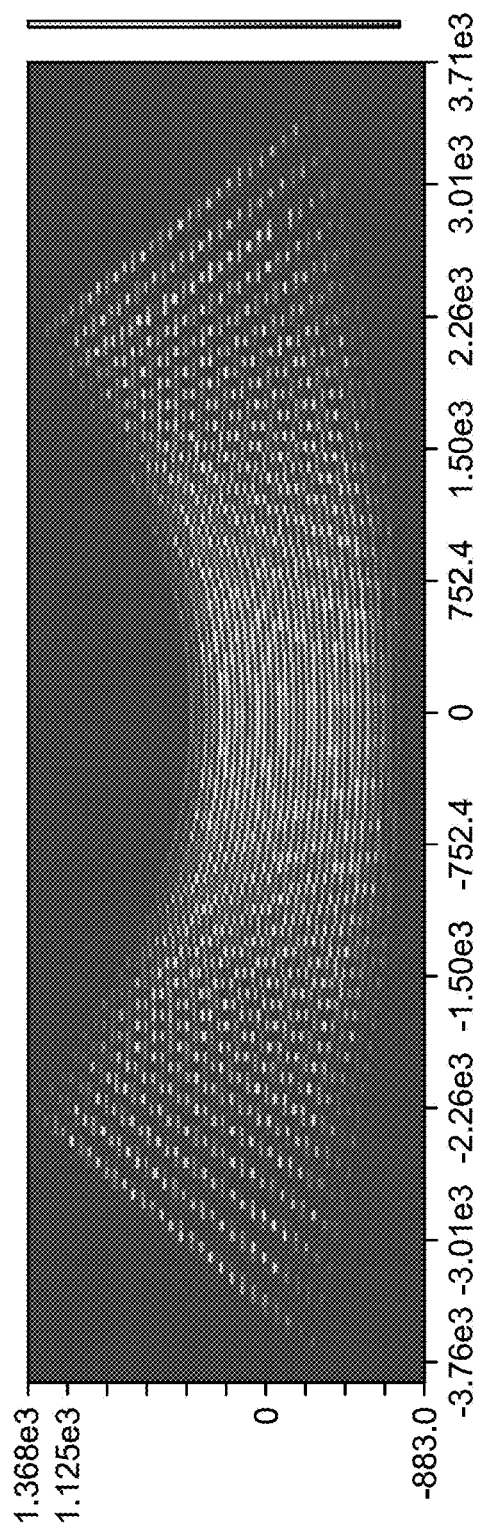
FIG. 11 depicts a portion of the scan pattern according to yet another embodiment.

FIG. 11 depicts a point map from a third design. This design has three channels (e.g., three light source outputs and three light detectors) to increase point density. About 2.88 million points per second can be obtained by using 3 fiber tips and 3 detectors. The resolution can be further reduced to 0.07 degrees for both directions. The speed of the polygon can be reduced to 6000 rpm.

Figure 12:
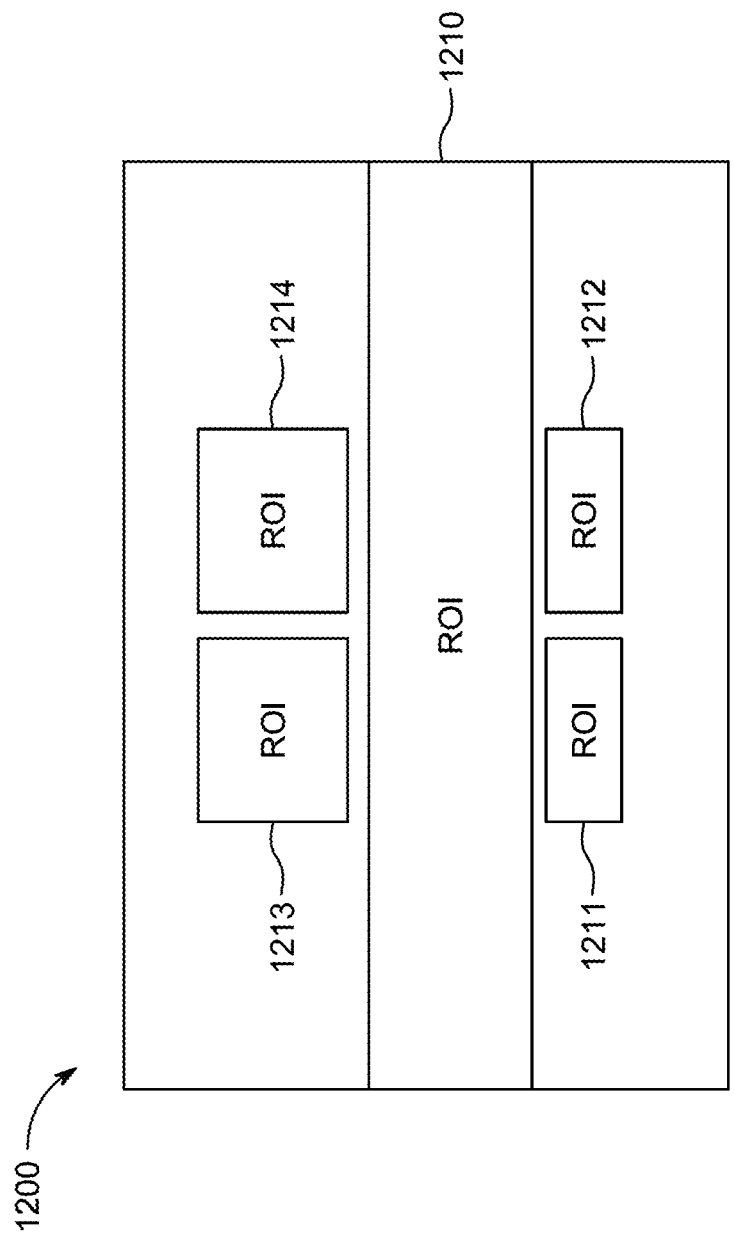
FIG. 12 shows illustrative field of view of a LiDAR system according to an embodiment.

FIG. 12 shows illustrative field of view (FOV) 1200 of a LiDAR system according to an embodiment. As shown, FOV 1200 is a two-dimensional space bounded by X and Y dimensions. Although the LiDAR system can collect data points from the entirety of FOV 1200, certain regions of interest (ROI) may have higher precedence over other regions within FOV 1200 (e.g., such as undesired regions that occupy all space within FOV 1200 that is not a ROI). FIG. 12 shows five different illustrative ROIs 1210-1214 to illustrate different regions within FOV 1200 that require additional data points than other regions within FOV 1200. For example, ROI 1210 occupies an entire band of a fixed y-axis height across the x-axis of FOV 1200. ROIs 1211 and 1212 show localized ROIs below ROI 1210, and ROIs 1213 and 1214 show localized ROIs above ROI 1210. It should be understood that any number of ROIs may exist and that the ROIs can occupy any portion of FOV 1200. Embodiments discussed herein enable additional data points to be collected in the ROIs in a manner that does not disrupt the operation of the LiDAR system.

Figure 13A:
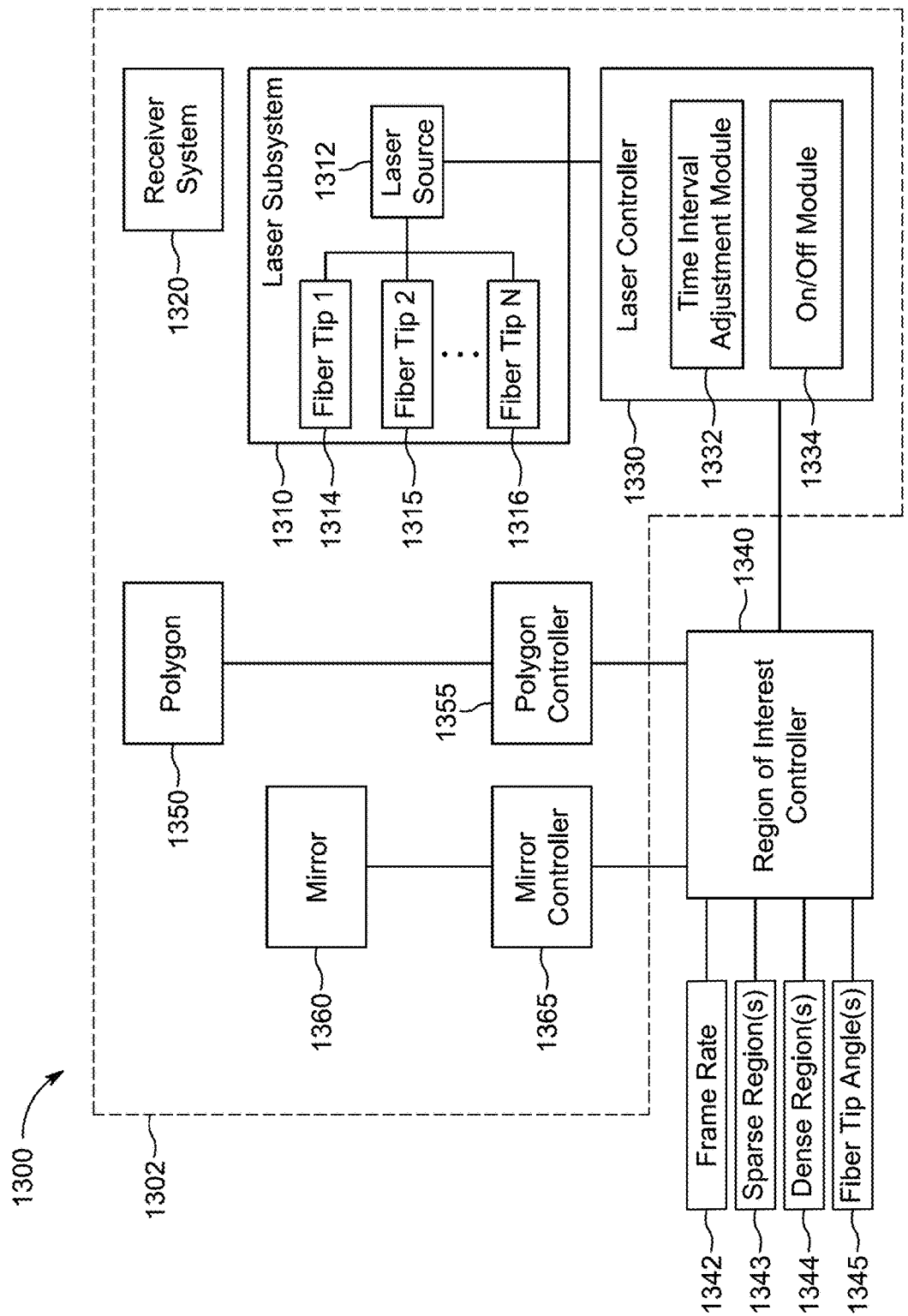
FIGS. 13A and 13B show illustrative block diagrams of LiDAR systems according to various embodiments.

FIG. 13A shows an illustrative block diagram of LiDAR system 1300 according to an embodiment. LiDAR system 1300 can include laser subsystem 1310, receiver system 1320, laser controller 1330, region of interest controller 1340, polygon structure 1350, polygon controller 1355, mirror 1360, and mirror controller 1365. LiDAR system 1300 may be contained within one or more housings. In multiple housing embodiments, at least one of the housings may be a temperature controlled environment in which selection portions of LiDAR system 1300 (e.g., laser controller 1330, laser source 1312, controller 1340) are contained therein.

Laser subsystem 1310 may be operative to direct light energy towards mirror 1360, which redirects the light energy to polygon structure 1350. Mirror 1360 also operative to redirect light energy received from polygon structure 1350 to receiver system 220. Mirror 1360 may be moved under the control of mirror controller 1365, which can control the speed and direction of mirror movement. As mirror 1360 moves, it causes light being transmitted by laser subsystem 1310 to interface with different portions of polygon structure 1350. Polygon structure 1350 is moving under the control of polygon controller 1355 and is operative to direct the light energy received from mirror 1360 in accordance with the field of view parameters of LiDAR system 1300. That is, if LiDAR system 1300 has a field of view with range of z, a lateral angle of x, and vertical angle of y, the range z can be controlled by the power of laser source 1312, the vertical angle y can be controlled by the movement of mirror 1360, and the lateral angle x can be controlled by polygon structure 1350. Light energy that is reflected back from objects in the field of view and returns to polygon structure 1350 where it is directed back to mirror 1360, which redirects it back to receiver system 1320.

As defined herein, a frame rate may refer to the time it takes for scanning system 1302 to complete one full scan of the FOV. For each frame, scanning system 1302 can obtain data points from each row (or column) of a plurality of rows (or columns) that are defined by the FOV. Each row may correspond to a vertical angle within the vertical range of the FOV. The vertical angle is controlled by mirror 1360. As mirror 1360 moves, the vertical angle changes, thereby enabling scanning system 1302 to obtain data points from multiple rows within the FOV. Vertical angle resolution refers spacing between adjacent rows of data points. An increase in vertical angular resolution corresponds to denser spacing between adjacent rows, and such an increase can be achieved by decreasing the delta of the vertical angles between adjacent vertical angles. The delta between adjacent vertical angels can be decreased by slowing down the movement of mirror 1360. That is, as mirror movement speed slows down, the change in the vertical angle delta decreases. A decrease in vertical angular resolution corresponds to sparser spacing between adjacent rows, and such a decrease can be achieved by increasing the vertical angle delta. The delta between adjacent vertical angels can be increased by speeding up the movement of mirror 1360. That is, as mirror movement speed speeds up, the change in the vertical angle delta increases.

The plurality of data points obtained within any row may depend on a horizontal angle within the horizontal range of the FOV. The horizontal range may be controlled by polygon 1350, and the horizontal angle resolution may be controlled by a time interval of successive laser pulses. The time interval is sometimes related to the repetition rate. A smaller time interval can result in increased horizontal angular resolution, and a larger time interval can result in decreased horizontal angular resolution.

The above reference to vertical and horizontal angles and vertical and horizontal angular resolution was made in reference to a system in which mirror 1360 controls the vertical angle. It should be understood that mirror 1360 can be repurposed to control the horizontal angle and used in a system different than that shown in FIG. 13.

Laser subsystem 1310 can include laser source 1312 and fiber tips 1314-1316. Any number of fiber tips may be used as indicated the "n" designation of fiber tip 1316. As shown, each of fiber tips 1314-1316 may be associated with laser source 1312. Laser source 1312 may be a fiber laser or diode laser. Fiber tips 1314-1316 may be aligned in a fixed orientation so that the light exiting each tip strikes mirror 1360 at a particular location. The actual orientation may depend on several factors, including, for example, frame rate, mirror movement and speed, polygon speed, ROIs, repetition rate, etc. Additional discussion of fiber tips and their characteristics in obtaining additional data points within ROIs is discussed in more detail below.

Receiver system 1320 can include various components such as optics, detectors, control circuitry, and other circuitry. The optics may contain light-transmitting optics that gather laser light returned from mirror 1360. Detectors may generate current or voltage signals when exposed to light energy through the optics. The detectors may be, for example, avalanche photo diodes. The outputs of the detectors can be processed by the control circuitry and delivered to a control system (not shown) to enable processing of return pulses.

Laser controller 1330 may be operative to control laser source 1312. In particular, laser controller 1330 can control power of laser source 1312, can control a repetition rate or time interval of light pulses emitted by laser source 1312 (via time interval adjustment module 1332), and can control pulse duration of laser source 1312. Time interval adjustment module 1332 may be operative to control and/or adjust the repetition rate/time interval of the transmitter pulse of laser 1310. Time interval adjustment circuitry 1332 can vary the repetition rate/time interval for different regions within the FOV. For example, the repetition rate may be increased for ROIs but may be decreased for areas of FOV that are not of interest. As another example, the time interval can be decreased for ROIs and increased for areas of FOV that are not of interest.

Region of Interest controller 1340 may be operative to control LiDAR system 1300 to obtain additional data points for the ROIs. That is, when LiDAR system 1300 is scanning a ROI, ROI controller 1340 may cause system 1300 to operate differently than when system 1300 is not scanning a ROI. ROI controller 1340 may control operation of laser controller 1330, polygon controller 1355, and mirror controller 1365 to alter the quantity of data being obtained by system 1300. ROI controller 1340 may receive several inputs that dictate how it should control the scanning subsystem 1302. The inputs can include, for example, frame rate 1342, sparse regions 1343, dense regions 1344, distance range, or any other suitable input. Frame rate 1342 may specify the frequency at which scanning subsystem 1302 completes a FOV scan. Sparse and dense regions 1343 and 1344 may provide specific locations of ROIs. For example, dense regions 1344 may correspond to ROIs and sparse regions 1343 may correspond to regions within the FOV that are not ROIs. Fiber tip angles 1345 may be used as a design constraint within which scanning sub-system 1302 operates in order to optimally perform scanning.

Polygon structure 1350 may be constructed from a metal such as aluminum, plastic, or other material that can have a polished or mirrored surface. Polygon structure 1350 may be selectively masked to control the lateral dispersion of light energy being projected in accordance with the field of view of scanning subsystem 1302. Polygon structure 1350 can include a number of facets to accommodate a desired horizontal field of view (FOV). The facets can be parallel or non-parallel to its symmetric axis. Polygon structure 1350 is operative to spin about an axis in a first direction at a substantially constant speed. The shape of polygon structure 1350 can be trimmed (e.g., chop off the sharp corner or tip to reduce overall weight or required geometry envelope, chamfer the sharp edge to reduce air resistance) for better operational performance.

Mirror 1360 may be a single plane or multi-plane mirror that oscillates back and forth to redirect light energy emitted by laser source 1312 to polygon 1350. The single plane mirror may provide higher resolutions at the top and bottom portions of the vertical field of view than the middle portion, whereas the multi-plane mirror may provide higher resolution at a middle portion of the vertical field of view than the top and bottom portions. Mirror 1360 may be a galvanometer. Varying the oscillation speed within an oscillation cycle can enable scanning subsystem 1302 to acquire sparse or dense data points within the FOV. For example, if dense data points are required (for a particular ROI), the movement speed may be reduced, and if sparse data points are required (for non-ROIs), the movement speed may be increased.

Figure 13B:
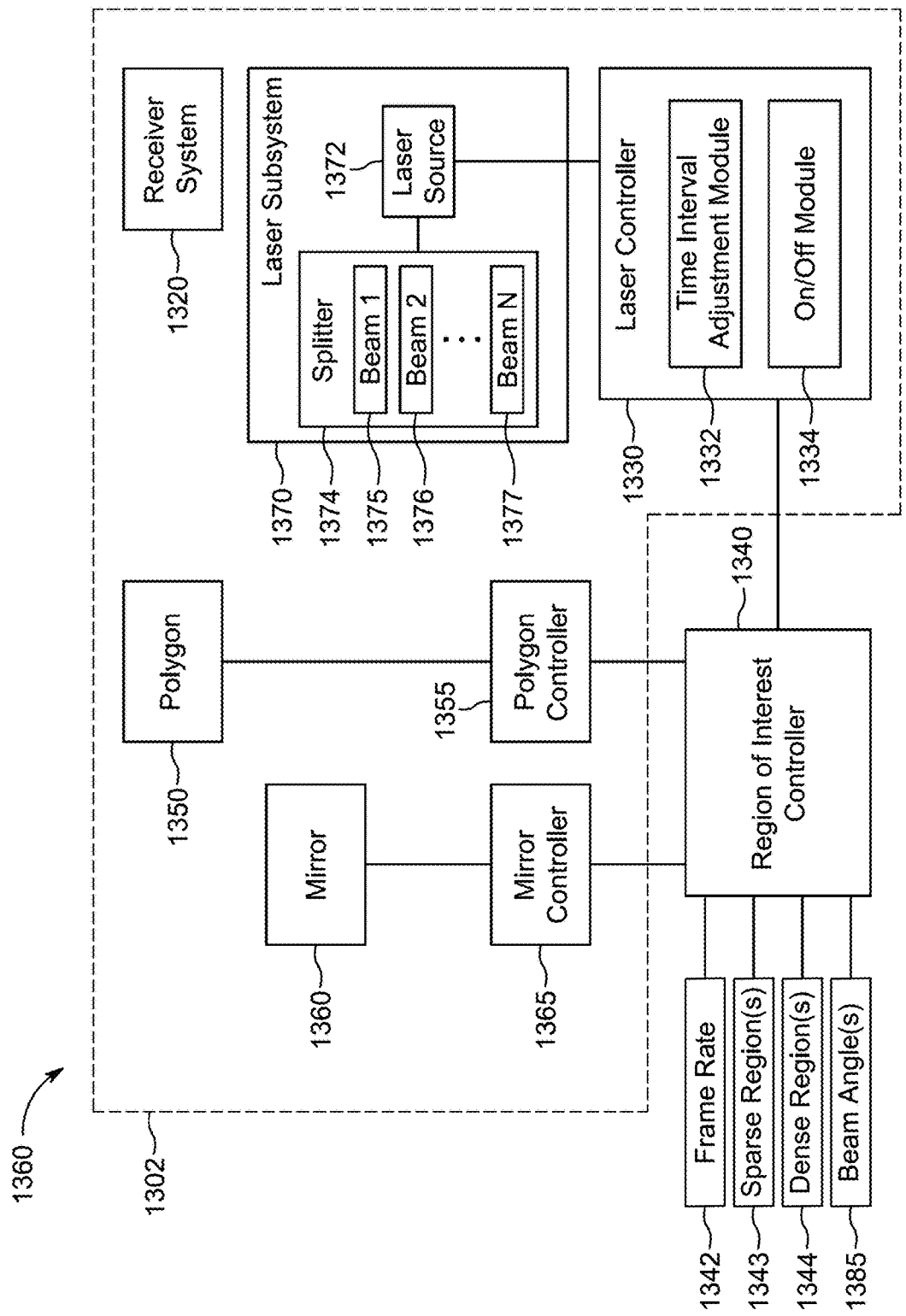

FIG. 13B shows an illustrative block diagram of LiDAR system 1360 according to an embodiment. LiDAR system 1360 is essentially the same as LiDAR system 1300, except laser subsystem 1310 has been replaced with laser subsystem 1370 and fiber tip angles 1345 has been replaced with beam angles 1385. Laser subsystem 1370 can include laser source 1372 and splitter 1374. Splitter 1374 is operative to provide several beams, such as beams 1375-1377, that are derived from lone laser source 1372. Any number of beams may exit out of splitter 1374, as indicated the "n" designation of beam 1377. Splitter 1374 is constructed to such that each of beams 1375-1377 exits splitter 1374 at a precise angle. This ensures that the desired angle, a, exists between adjacent beams. That is, the inter-beam angle (e.g., change of angle between adjacent beams) is the same. The actual inter-beam angle may depend on several factors, including, for example, frame rate, mirror movement and speed, polygon speed, ROIs, repetition rate, etc. Additional discussion of how splitters according to embodiments discussed herein are able to control the inter-beam angle of all existing beams can be found in FIGS. 19, 20, 21A, 21B, 21C, 22A, 22B, 22C, 22D, 22E, 22F, 22G, 23, 24, 25, 26A, 26B, 27A, and 27B. Beam angles 1385 may be used as a design constraint within which scanning sub-system 1302 operates in order to optimally perform scanning.

Figure 14:
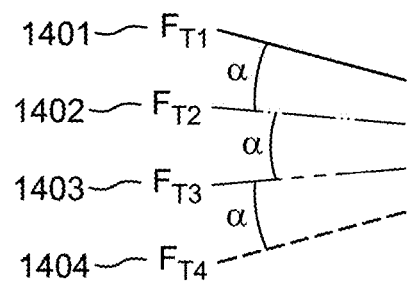
FIG. 14 shows an illustrative fiber tip arrangement according to an embodiment.

FIG. 14 shows illustrative fiber tip arrangement according to an embodiment. Four fiber tips 1401-1404 are shown to be oriented with respect to each other such that the same angle α exist between adjacent fiber tips. Multiple fiber tips (as opposed to just one fiber tip) may be used so that high data collection is achieved. When an ROI is being scanned, the mirror movement speed is adjusted to a ROI speed (e.g., a speed that is slower than a sparse or non-ROI speed), the combination of additional fiber tips and reduced relative mirror movement speed yields denser data capture. Moreover, when a non-ROI is being scanned, the mirror movement speed operates at a non-ROI speed (e.g., a speed that is faster than the ROI speed), the presence of multiple fiber tips ensures that sufficient data collection is achieved. The angle α may be selected based on properties of the light energy being emitted by each fiber tip (e.g., size), speed and movement characteristics of a mirror (e.g., mirror 1360) for both ROIs and non-ROIs, and speed of the polygon (e.g., polygon structure 1350). The angles between each of tips may be the same or they can be different.

In some embodiments, all four fiber tips may be associated with the same laser source. Thus, if the laser source is turned OFF, none of the fiber tips will emit light energy. In another embodiment, each fiber tip may be associated with its own respective laser source. This embodiment provides a high degree of ON/OFF control of each fiber tip. In yet another embodiment, a subset of the fiber tips may be associated with the same laser source. For example, fiber tips FT1 and FT3 may share a first common laser source, and fiber tips FT2 and FT4 may share a second common laser source. This embodiment provides a balance between all or none and individual ON/OFF control.

Figure 15A:
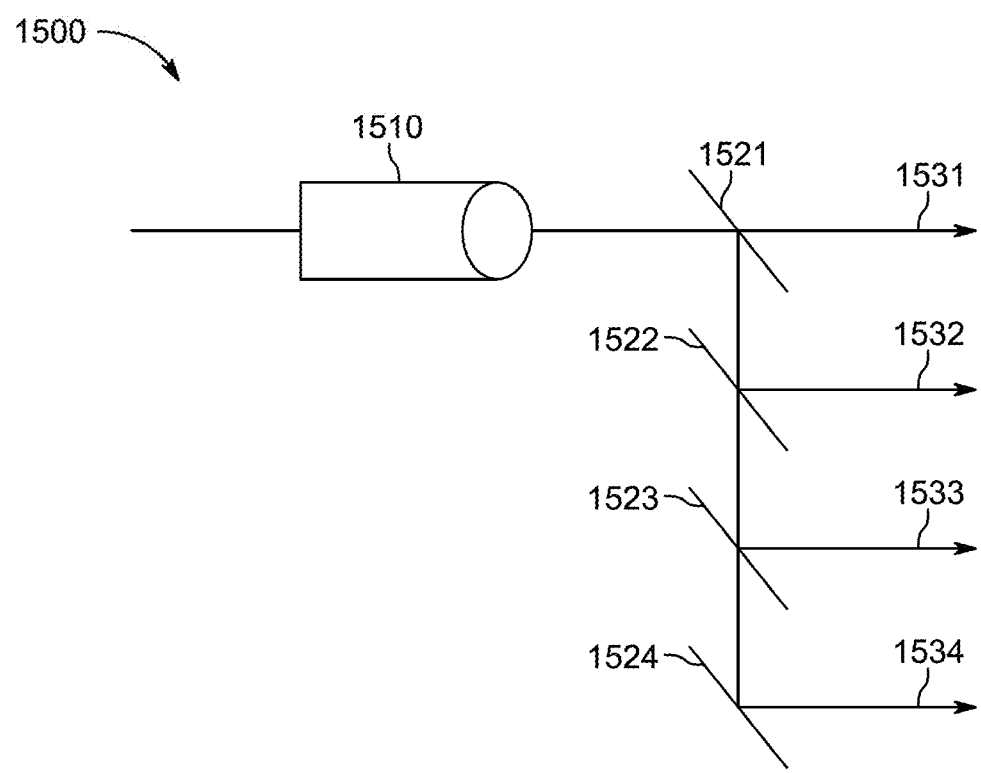
FIGS. 15A and 15B show multiple mirror alignment arrangement that may be used for ROI and non-ROI embodiments.

FIG. 15A shows a multiple mirror alignment arrangement (MMAA) 1500 that may be used for ROI and non-ROI embodiments. MMAA 1500 is an alternative to using multiple fiber tips such as that shown in FIG. 14. As shown, MMAA 1500 shows collimator 1510, partial reflective mirrors 1521-1523, and reflective mirror 1524. Light energy originating from a laser source (not shown) is routed to collimator 1510, which directs light energy to partial reflective mirror 1521. Partial reflective mirror 1521 permits a portion of the light energy to pass through (shown as exit path 1531) and the remaining light energy is redirected to partial reflective mirror 1522. Partial reflective mirror 1522 allows a portion of the light energy to pass through to partial reflective mirror 1523. Partial reflective mirror 1522 redirects light energy along exit path 1532. Partial reflective mirror allows a portion of the light energy to pass through to partial reflective mirror 1524. Partial reflective mirror 1523 redirects light energy along exit path 1533. Reflective mirror 1524 may redirect all or at least a portion of all the remaining light energy along exit path 1534.

The angles between adjacent exit paths may be selected to achieve the desired resolution for ROIs and non-ROIs. For example, angles between adjacent exit paths may be similar to the a angles shown in FIG. 14. In some embodiments, the angle between adjacent exit paths may be fixed. In other embodiments, the angle between adjacent exit paths may be variable. Variable angle adjustment may be used to provide different resolutions on demand. For example, if the LiDAR system is being used in a vehicle, the angles may be set to a first configuration when the vehicle operating in a first mode (e.g., driving at highway speeds or vehicle is driven by a first driver) and may be set to a second configuration when the vehicle is operating in a second mode (e.g., driving at city speeds or vehicle is driven by a second driver).

Figure 15B:
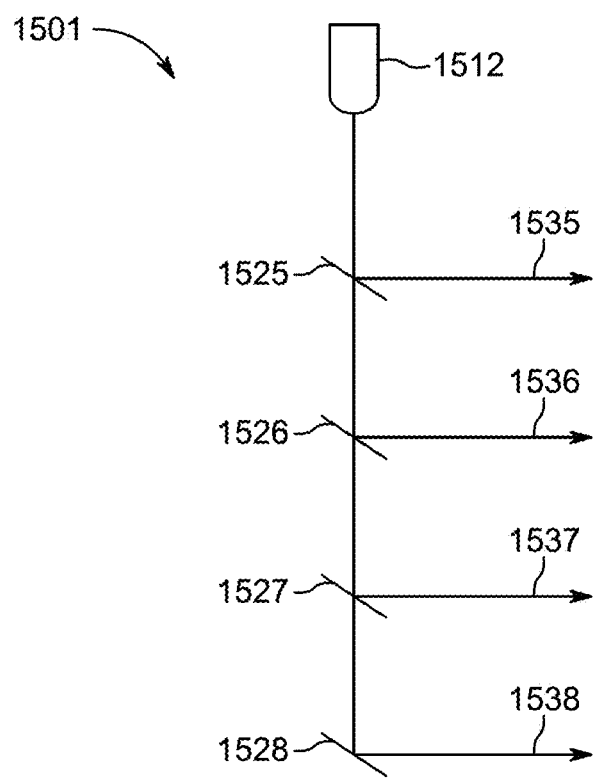

FIG. 15B shows another multiple mirror alignment arrangement (MMAA) 1501 that may be used for ROI and non-ROI embodiments. MMAA 1501 is an alternative to MMAA 1500. As shown, MMAA 1501 shows collimator 1512, partial reflective mirrors 1525-1527, reflective mirror 1528, and exit paths 1535-1538. MMAA 1501 is similar to MMAA 1500 with exception of the positioning of collimator 1512. As shown, collimator 1512 is positioned above mirror 1525. If desired, collimator 1512 can be positioned below mirror 1528. As a further alternative, collimator 1512 can be aimed at a different mirror such as mirror 1526 or mirror 1527, and such mirrors can redirect the light energy as necessary to achieve the desired results.

Figure 15C:
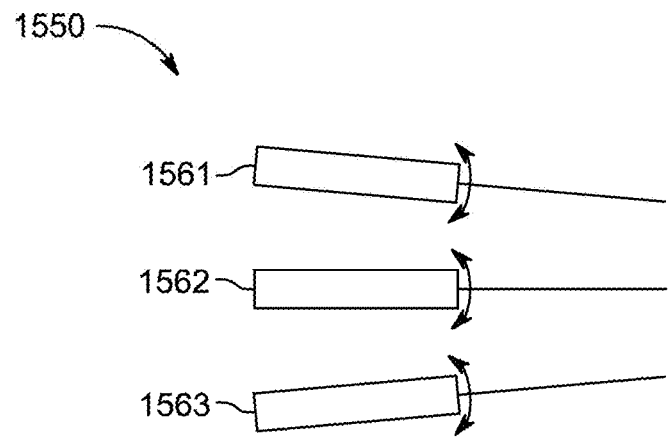
FIG. 15C shows an illustrative multiple collimator arrangement that may be used for ROI and non-ROI embodiments.

FIG. 15C shows an illustrative multiple collimator arrangement 1550 that may be used for ROI and non-ROI embodiments. Arrangement 1550 can include collimators 1561-1563. Each of collimators 1561-1563 may be associated with its own laser source. Associating each collimator with its own laser source enables selective turning ON and OFF of light energy emanating from each collimator. For sparse regions, one or more of the laser sources may be turned OFF (to save power) and for dense regions, all laser sources may be turned ON to maximize resolution. Each of collimators 1561-1563 may be fixed in a particular orientation to achieve the desired a angle between each collimator. If desired, each of collimators 1561-1563 may be movable to dynamically adjust the a angle between each collimator.

Figure 15D:
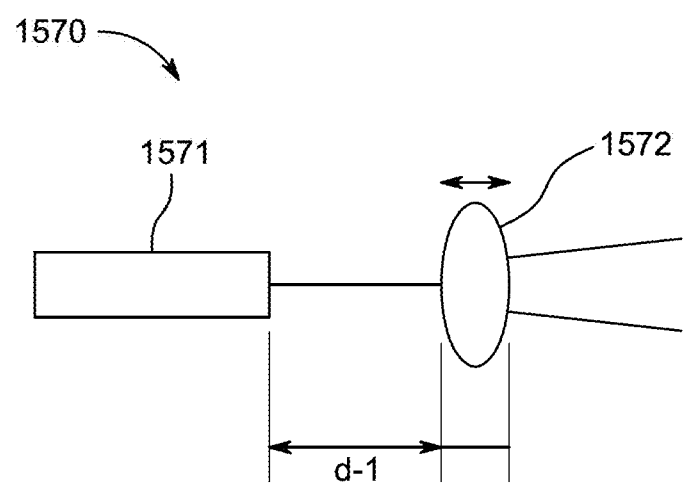
FIG. 15D shows an illustrative collimator and lens arrangement according to an embodiment.

FIG. 15D shows an illustrative collimator and lens arrangement 1570 that may be used to control divergence of the light beam existing collimator 1571 according to an embodiment. Lens 1572 may be moved towards and away from collimator 1571 to adjust divergence of the light beam. Arrangement 1570 may be used to adjust the size of the light beam as it is projected by the scanning system. For ROI regions, it may be desirable to have a relatively narrow beam. To produce a relatively narrow beam, lens 1572 may positioned at a narrow beam distance away from the collimator 1571. For non-ROI regions, it may be desirable to have a relatively wide beam. To produce a relatively wide beam, lens 1572 may positioned at a wide beam distance away from the collimator 1571.

Figure 16:
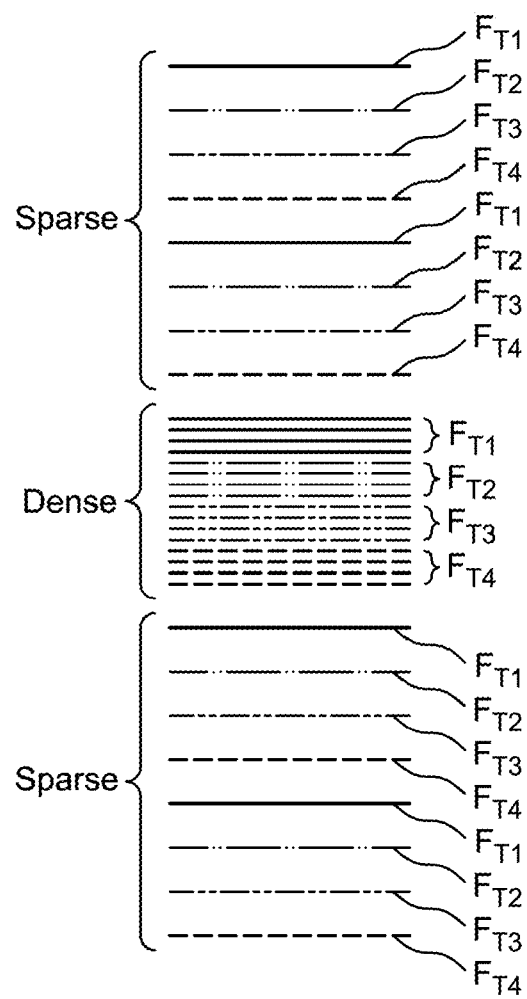
FIG. 16 shows illustrative scanning resolution using multiple fiber tips, a multiple mirror alignment arrangement, or multiple collimator arrangement according to an embodiment.
Figure 17A:
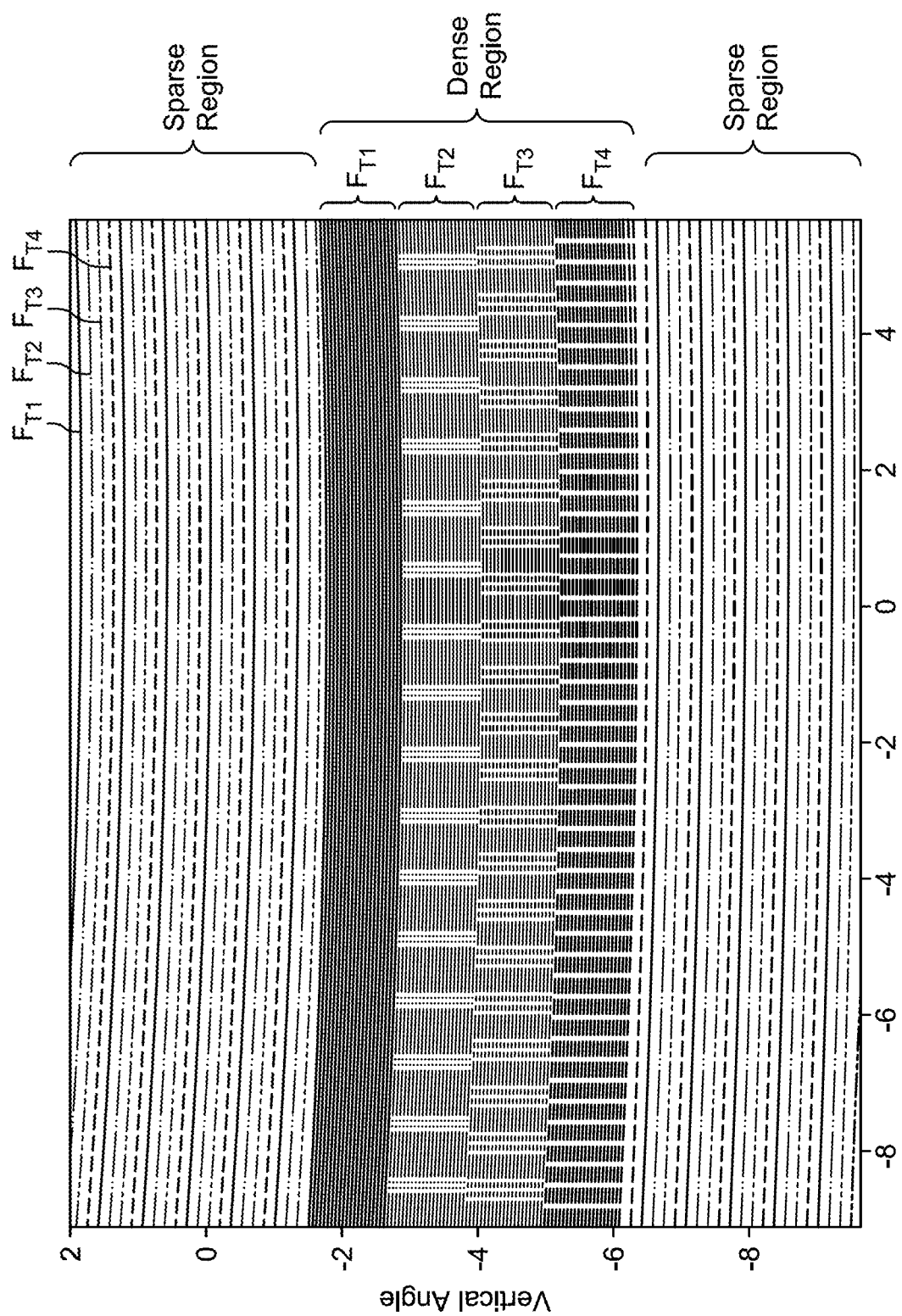
FIG. 17A shows another illustrative diagram of vertical resolution using multiple fiber tips or a multiple mirror alignment arrangement, according to an embodiment.

FIG. 16 shows illustrative scanning resolution using multiple fiber tips, a multiple mirror alignment arrangement, or multiple collimator arrangement according to an embodiment. The illustrative vertical resolution lines from fiber tips (FT1-FT4) are shown. The resolution lines are grouped according to sparse resolution and dense resolution as shown. In sparse regions, the scanning system is moving the mirror at a relatively faster speed than when in the dense region, and in dense regions, the scanning system is moving the mirror at a relatively slower speed than when in the sparse region. The spacing between the adjacent scanning lines (as shown by the repeated pattern of FT1-FT4) is substantially equidistant. This equidistant spacing may be made possible by coordinating the alignment of the fiber tips with the frame rate, mirror speed, polygon speed, and any other suitable factors. In contrast, if alignment of fiber tips is not properly coordinated, the equidistant spacing may not be possible, thereby yielding an undesirable scanning pattern. In the dense region, each fiber tip may provide multiple lines of resolution. For example, as shown, FT1 provides four lines of resolution before FT2 provides its four lines of resolution. Thus, each fiber tip provides four lines of resolution before transitioning to the next fiber tip. It should be understood that the number of lines of resolution provided by each fiber tip depends on a number of factors, including, for example, mirror speed, polygon speed, and angle between fiber tips. The lines of resolution among fiber tips may interlace at the transition between the sparse and dense regions. For example, at least one line of resolution from one or more of fiber tips FT2-FT4 may be interlaced among the four lines of resolution pertaining to FT1 (as shown in FIG. 17A).

The angle between the fiber tips (e.g., the a) may be selected based on the mirror speeds, polygon speed, desired angular resolution of the ROI, and a requirement for the spacing between the resolution lines in the sparse region(s) to be substantially equidistant to each other. At least two different mirror speeds are used to provide the dense and sparse resolutions, and it is the variance in mirror speeds that can cause the resolution lines to be non-equidistant if the angles between fiber tips are not properly aligned. For example, assume that the angle of the dense region is $\theta$. $\theta$ can represent the total degrees within the FOV that are part of the ROI and require dense resolution. If the mirror speed is constant throughout the entire frame, the angle between fiber tips, a, can be approximately $\theta/n$, where n is the number of fiber tips. This as, referred to as angle with constant speed may represent a target angle for the fiber tips, but additional calculations are required to take into account that the mirror operates at different speeds, and as a result $\alpha$, cannot be set to exactly $\theta/n$. The sparse regions must be taken into account. In the sparse region, assume that the desired angle between adjacent lines of resolution is $\phi$. For the example, $\phi$ may exist between FT1 and FT2, between FT2 and FT3, between FT3 and FT4, between FT4 and FT1 in the sparse region. In order to achieve 4 between different fiber tips, the angle between fiber tips can be calculated by the following equation:

$$\alpha = \alpha_{vs} = \phi * n * 2 - \phi$$

where $\alpha_{vs}$ is the angle with a variable speed mirror, $\phi$ is the angle between adjacent lines of resolution within the sparse region, n is the number of fiber tips, and the number 2 is a scaling factor to take into account overlapping lines of resolution. The variables of $\phi$, n, mirror speed, and polygon speed are selected such that $\alpha_{vs}$ is the same as or approximately the same as $\alpha_{cs}$. Selecting the variables such that $\alpha_{vs}$ is the same as or approximately the same as $\alpha_{cs}$, enables the scanning system to achieve the desired scanning densities for both ROI and non-ROI regions within the FOV each frame.

FIG. 17A shows another illustrative diagram of vertical resolution using multiple fiber tips or a multiple mirror alignment arrangement, according to an embodiment. Sparse regions and a dense region are shown. Four fiber tips FT1-4 are used. In the sparse region, the resolution lines for each fiber tip are evenly spaced. In the dense region, the vertical lines of resolution are substantially more dense than the vertical lines of resolution in the sparse regions. Within the dense region, the vertical lines of resolution are grouped predominantly for each fiber tip, however, interlacing resolution lines from other fiber tips may exist within a particular group.

Figure 17B:
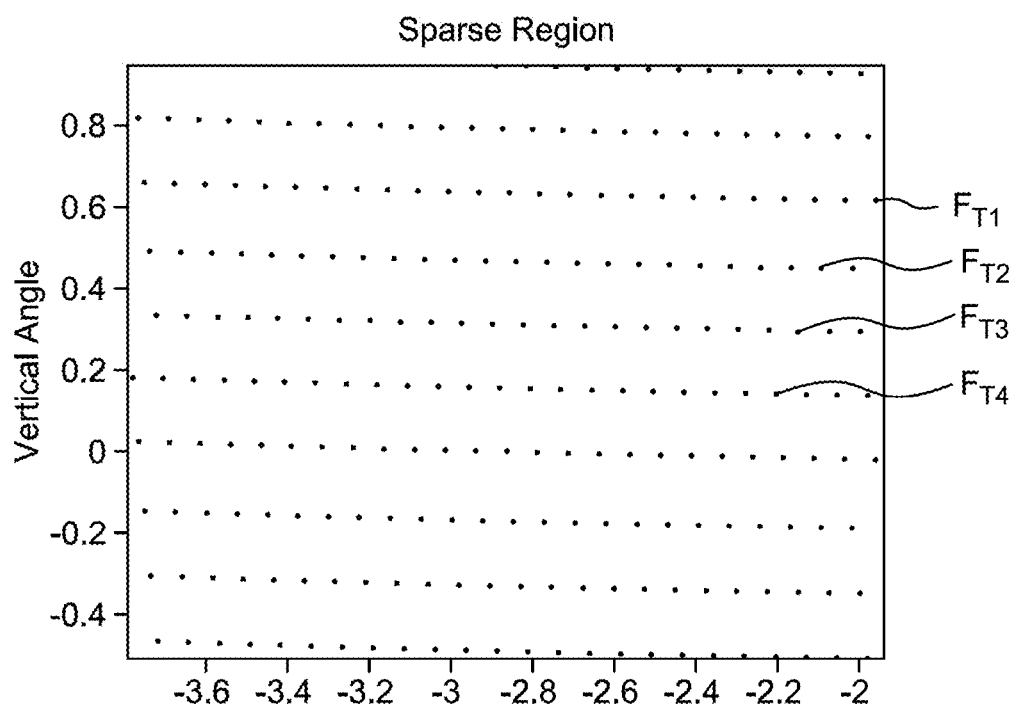
FIG. 17B shows an illustrative close-up view of a sparse region within FIG. 17A
Figure 17C:
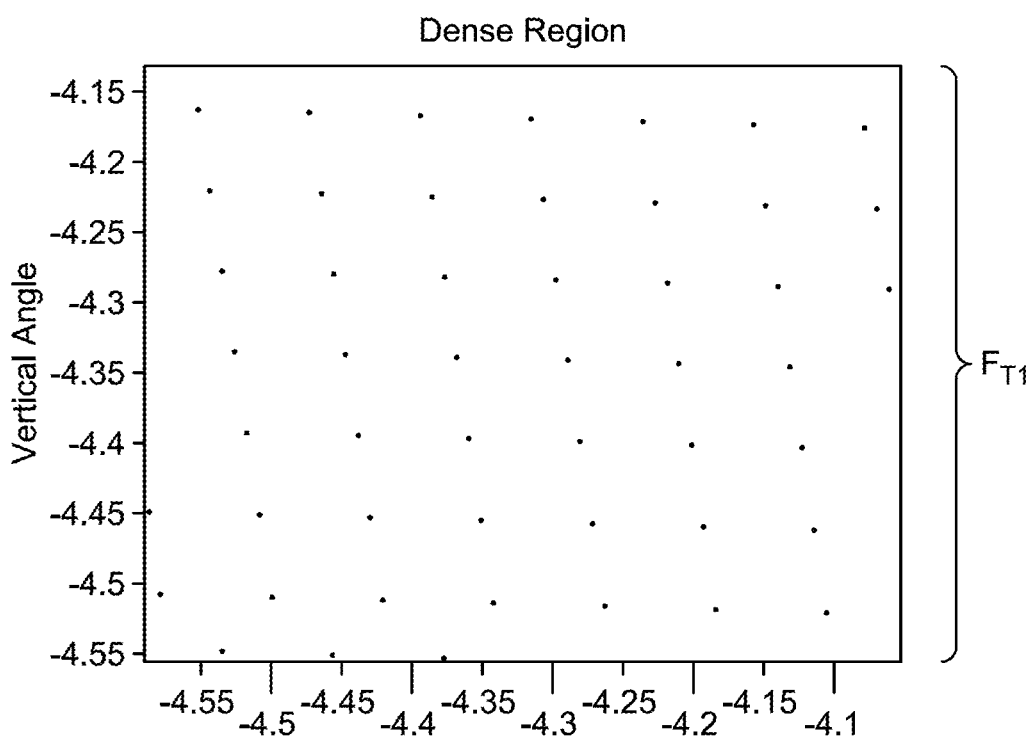
FIG. 17C shows an illustrative close-up view of the dense region within FIG. 17A, according to various embodiments.

FIG. 17B shows an illustrative close-up view of a sparse region within FIG. 17A and FIG. 17C shows an illustrative close-up view of the dense region within FIG. 17A, according to various embodiments. Note that the scaling factor in FIG. 17B is less zoomed in than it is in FIG. 17C. As a result, FIG. 17B shows lines of resolution for multiple fiber tips, and where FIG. 17C shows multiple lines of resolution for only one fiber tip.

The dynamic resolution discussed above has been in the context of dynamic vertical resolution. If desired, the laser subsystem (e.g., the fiber tips, multiple mirror alignment arrangement, or multiple collimator arrangement) can be oriented in a horizontal direction (as opposed to the above-described vertical direction) to provide dynamic horizontal resolution.

Assuming speed changes to mirror movement are used to control the vertical resolution, the repetition rate or time interval can be changed to dynamically control the horizontal resolution. This provides dual axis dynamic resolution control that can be synchronized by a controller (e.g., ROI controller 1340) to provide increased resolution for ROIs and decreased resolution for non-ROIs for both vertical and horizontal orientations. For example, when the scan cycle comes across an ROI, the mirror movement speed is decreased and the time interval between successive light pulses is decreased (thereby increasing repetition rate). When the scan cycle comes across a non-ROI, the mirror movement speed is increased and the time interval between successive light pulses is increased (thereby decreasing repetition rate).

In some embodiments, the laser source(s) can be selectively turned ON and OFF to provide vertical dynamic range (assuming the laser subsystem is oriented as such). This can eliminate the need to adjust the mirror speed to achieve dynamic vertical resolution. If desired, however, the laser source(s) can be selectively turned ON and OFF in conjunction with variations in mirror movement speed.

Figure 18:
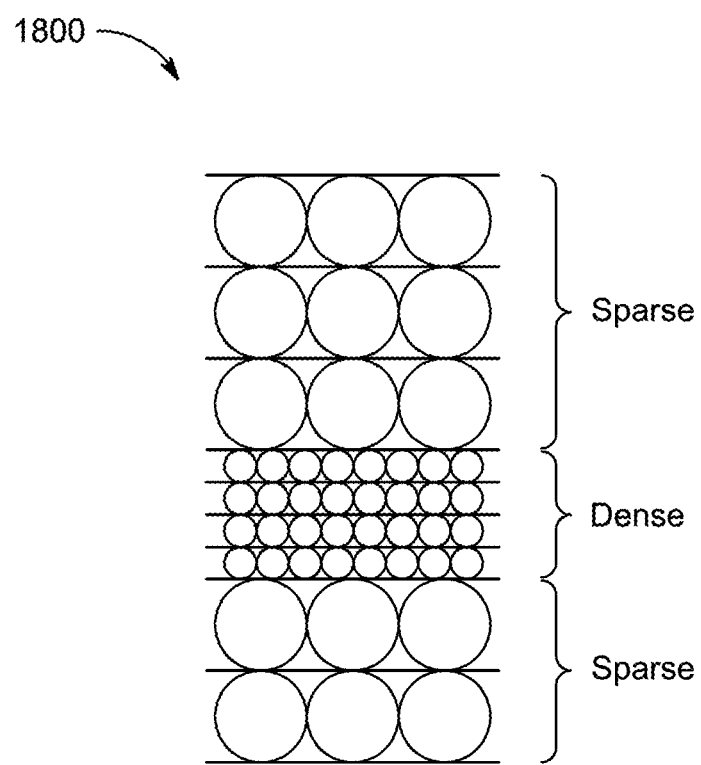
FIG. 18 shows illustrative an FOV with variable sized laser pulses according to an embodiment.

FIG. 18 shows illustrative FOV 1800 with variable sized laser pulses according to an embodiment. FOV 1800 includes two sparse regions and one dense region as shown. Both the sparse and dense regions show illustrative light pulses that take the form of different sized circles. The sparse sized circles are larger than the dense sized circles. When the scanning system is projecting light to sparse region, the mirror speed may be moving at a sparse speed and the repetition rate may be set to a sparse region repetition rate. Conversely, when the scanning system is projecting light to the dense region, the mirror speed may be moving at the dense speed and the repetition rate may be set to a dense region repetition rate. The sparse speed is faster than the dense speed and the sparse region repetition rate is slower than the dense region repetition rate. As a result, there are fewer light pulses being sent into the sparse region than in the dense region. If the circle size of the light pulses projected into the sparse region were the same size as the circles in the dense region, underfilling could exist. Underfill may occur when too much space exists between adjacent light pulse circles. Thus, in order to minimize underfill, it is desirable to project an appropriately sized light pulse for both the sparse and dense regions.

The ROI concepts discussed above in connection with FIGS. 13A, 13B, and 16-18 can also be realized using single source, multi-beam (SSMB) splitters according to embodiments discussed herein. SSMB splitters according to embodiments discussed herein can produce multiple beams from a single source, precisely control the exit angle of each beam, and ensure that each beam has substantially the same intensity. In addition, SSMB splitters eliminate beam angle alignment issues that can sometimes plague other beam splitters (e.g., those shown in FIGS. 15A-D). Manufacturability and ease of assembly, and by extension, ease of establishing and maintaining precise inter-beam angles is a hallmark and advantage of the SSMB splitter embodiments discussed herein. The SSMB may be a monolithic structure with different coatings applied to one or two surfaces thereof.

Figure 19:
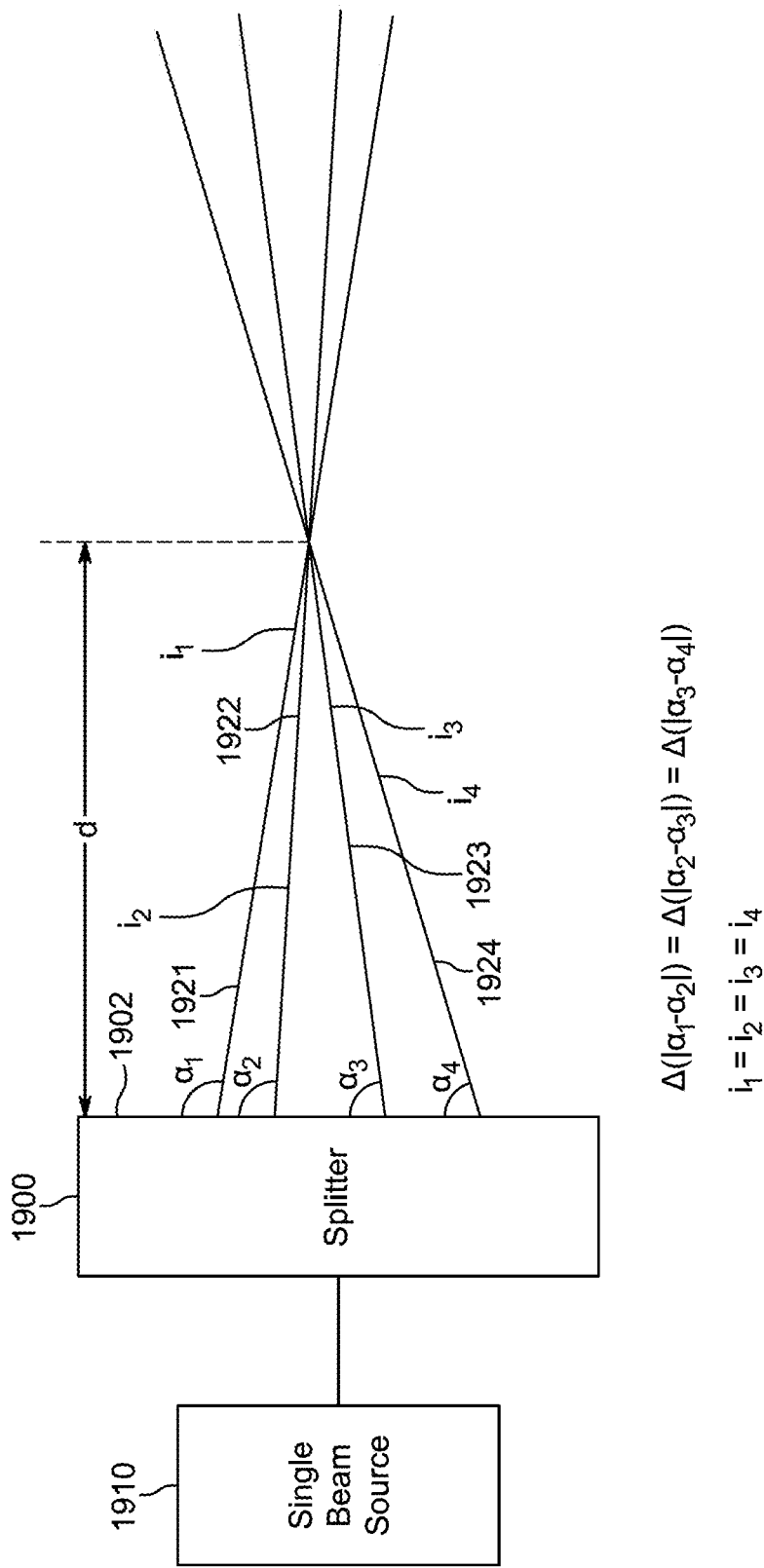
FIG. 19 shows illustrative splitter according to an embodiment.

FIG. 19 shows illustrative SSMB splitter 1900 according to an embodiment. SSMB splitter 1900 can receive a single beam from single beam source 1910 and produce N beams, where N is any number of beams. As shown, SSMB splitter 1900 produces four beams, shown as beams 1921-1924. Beams 1921-1924 are transmitted out of SSMB splitter via exit plane 1902 at angles, $\alpha_1$, $\alpha_2$, $\alpha_3$, and $\alpha_4$, respectively, and each of beams 1921-1924 have respective intensities, $i_1$-$i_4$. The inter-beam angle between adjacent beams is the same. For example, equation 1 below shows that the inter-beam angle (IBA) is same for each adjacent pair of beams.

$$IBA = \Delta(|\alpha 1 - \alpha 2|) = \Delta(|\alpha 2 - \alpha 3|) = \Delta(|\alpha 3 - \alpha 4|) \quad (1)$$

In addition the intensities of each beam are also the same, or substantially the same, as shown by equation 2, below.

$$i1 = i2 = i3 = i4 \quad (2)$$

The inter-beam angles are such that each of beams 1921-1924 converges at the same point at a fixed distance, d, from exit plane 1902.

Figure 20:
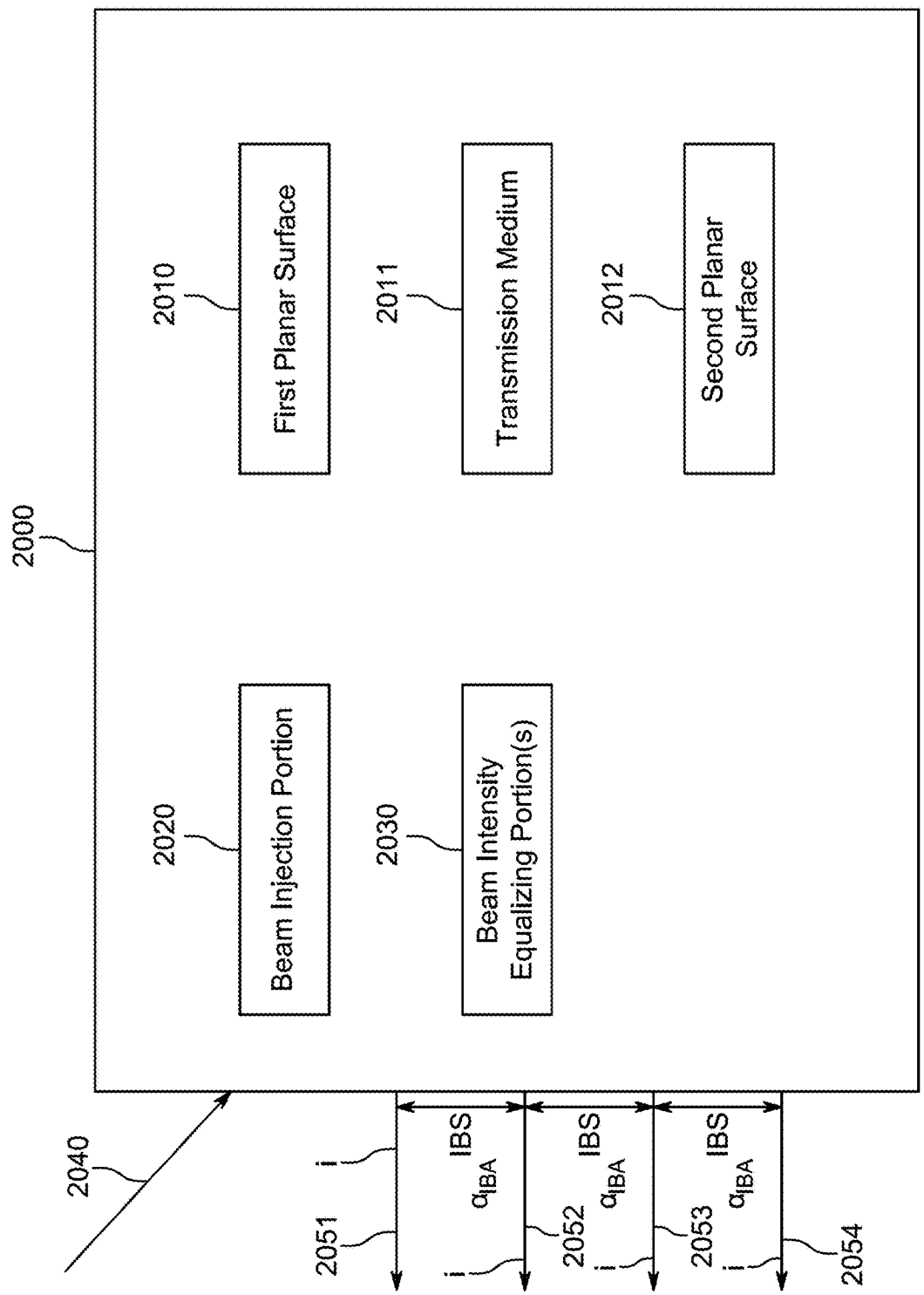
FIG. 20 shows an illustrative block diagram of a splitter according to an embodiment.

FIG. 20 shows an illustrative block diagram of SSMB splitter 2000 according to an embodiment. SSMB splitter 2000 can include first planar surface 2010, transmission medium 2011, second planar surface 2012, beam injection portion 2020, and beam intensity equalizing portion(s) 2030. During use of SSMB splitter 2000, input light beam 2040 can be received via beam injection portion 2020, and input light beam 2040 interacts with first planar surface 2010, transmission medium 2011, second planar surface 2012, and beam intensity equalizing portion(s) 2030 to produce output beams 2051-2054. Only four output beams are shown, but it should be understood that any number of beams (e.g., two or more beams) may be produced by SSMB splitter 2000. Each of output beams 2051-2054 can have substantially the same intensity, i, and the same inter-beam angle, $\alpha_{IBA}$, can exist between adjacent output beams. In addition, output beams 2051-2054 converge and exit SMBB splitter 2000 at equidistance angles. Output beams 2051-2054 can be produced when input light beam 2040 is reflected between first and second planar surfaces 2010 and 2012, and the reflected light exits out of one or both of first and second planar surfaces 2010 and 2012. In some embodiments, an exit beam can be the reflection of input light beam 2040 at beam injection portion 2020.

First planar surface 2010, transmission medium 2011, and second planar surface 2012 can be arranged with respect to each other to control the exit angle of beams 2051-2054 such that the same inter-beam angle, $\alpha_{IBA}$, exists between adjacent output beams. According to embodiments discussed herein, control over the exit angle (and thus by extension, the inter-beam angle) can be achieved by ensuring that the relative angles of first and second planar surfaces 2010 and 2012 vary from each other by a wedge angle. The wedge angle ensures that first and second planar surfaces are not parallel to each other. The value of the wedge angle (or degree to which first and second planar surfaces 2010 and 2012 are not parallel to each other) can depend on several factors, including an angle of incidence (AOI) of input light beam 2040, a diameter of input light beam 2040, the desired inter-beam angle, $\alpha_{IBA}$, and a desired inter-beam spacing. The AOI of input light beam 2040 can refer to the angle at which light beam 2040 makes with respect to the normal to the surface (e.g., surface of beam injection portion 2020, first planar surface 2010, or second planar surface 2012) at the point of incidence. Inter-beam spacing (IBS) can refer to the spacing between adjacent output beams at the exit plane (e.g., first and/or second planar surfaces 2010 and 2012).

In some embodiments, arrangement of first planar surface 2010 at a wedge angle with respect to second planar surface 2012 may be referred to as a wedged Fabry-Perot. In a relatively simple embodiment, first planar surface 2010 and second planar surface 2012 can both be glass plates that are separated by transmission medium 2011 such as air. In this embodiment, first planar surface 2010 can be constructed from a material that is partially reflective, which enables light to pass through and to be reflected. Second planar surface 2012 may be constructed from a material that is completely reflective, which reflects all light interfacing therewith.

Figure 22A:
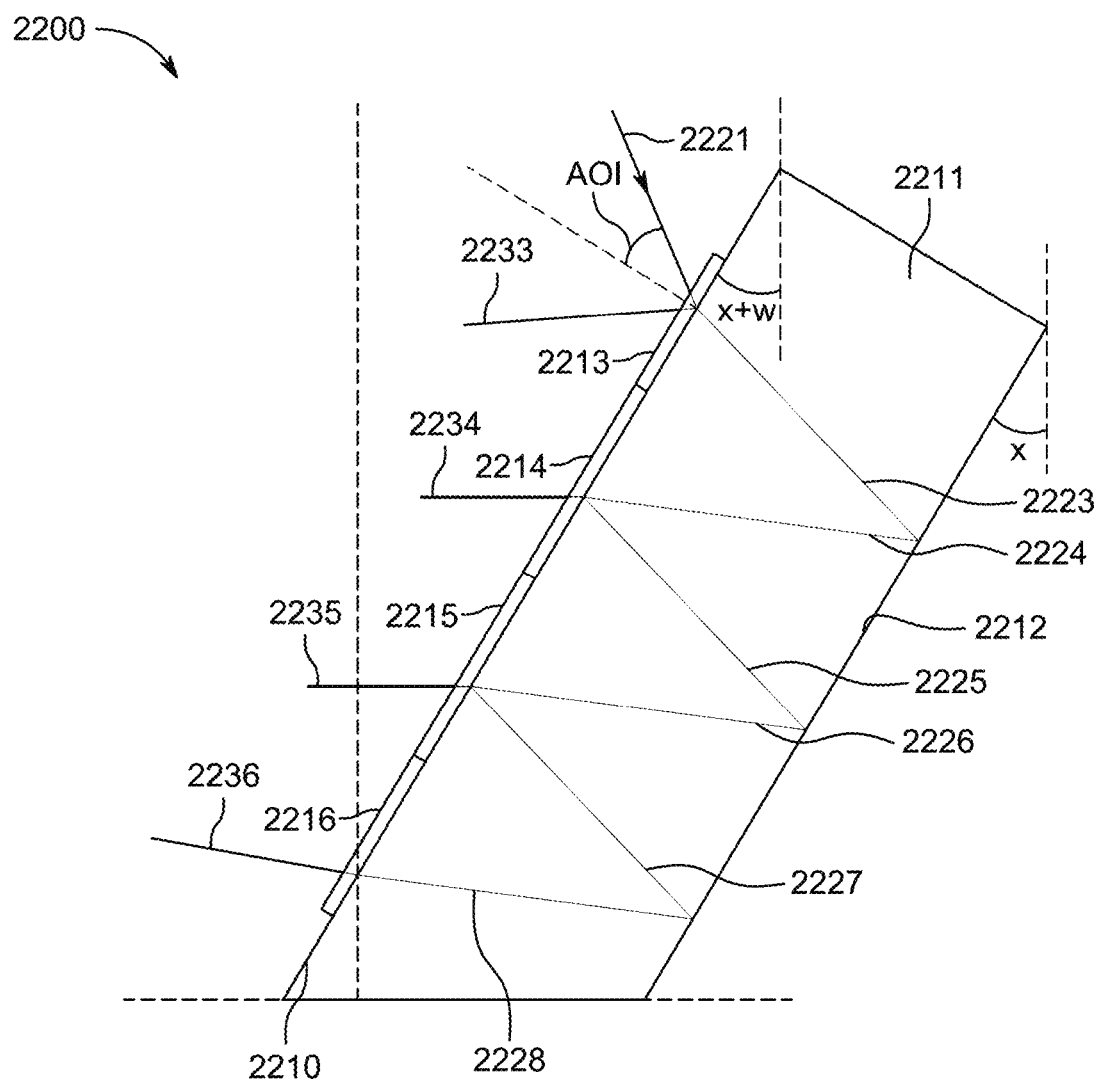
FIGS. 22A and 22B show illustrative side and perspective views of a wedge splitter according to an embodiment.
Figure 22B:
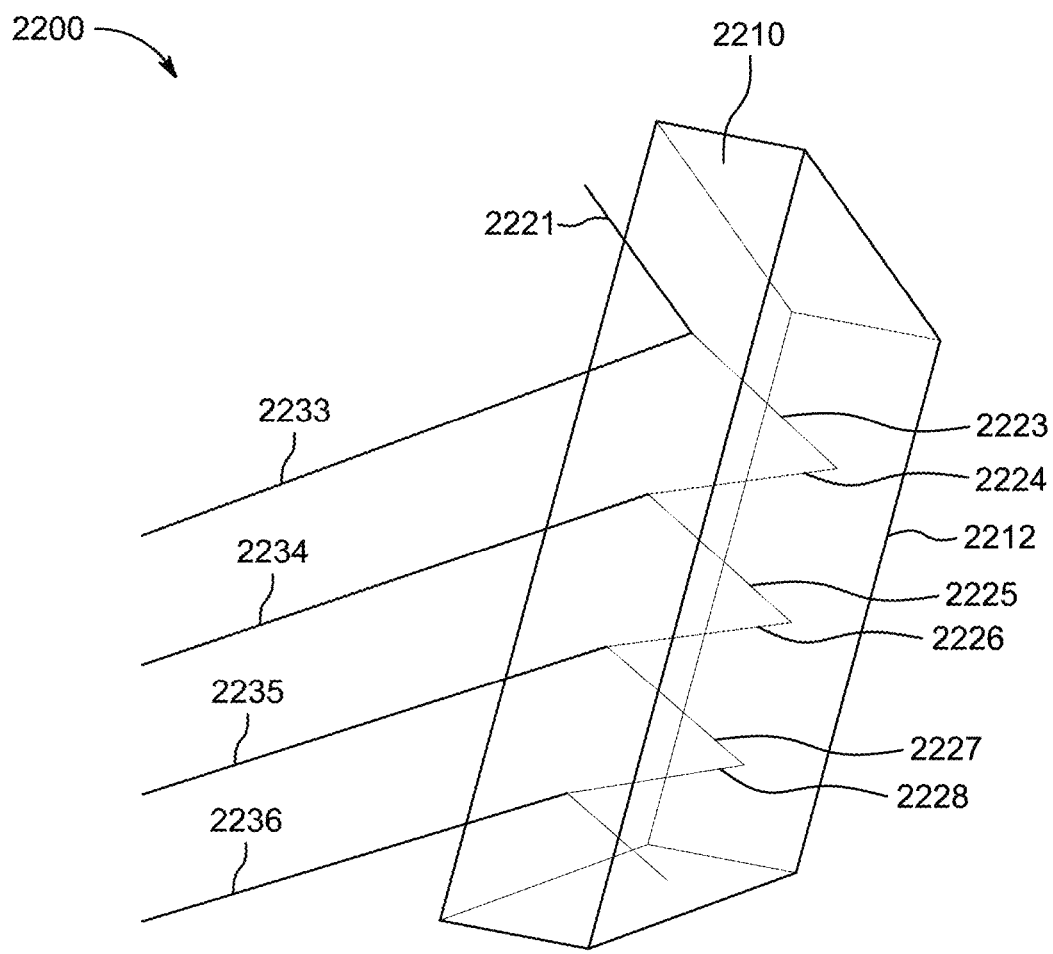

In another embodiment, SMBB splitter 2000 can be a monolithic structure such as a prism that includes first planar surface 2010, transmission medium 2011, second planar surface 2012, beam injection portion 2020, and beam intensity equalizing portion(s) 2030. In some embodiments, the prism can be a trapezoidal prism (e.g., as shown in FIGS. 22A-22B). In the monolithic or prism embodiments, first planar surface 2010, transmission medium 2011, and second planar surface 2012 may be included as a single integrated structure (e.g., a piece of glass). For example, in one such prism embodiment, beam intensity portions 2030 can be applied to or integrated with first surface 2010 and a mirror coating can be applied to or integrated with second planar surface 2012.

Beam intensity equalizing portion(s) 2030 are operative to ensure that the intensity of each of output beams 2051-2054 is substantially equal. Beam intensity equalizing portion(s) 2030 may be disposed on one or both of first and second planar surfaces 2010 and 2012. Portions 2030 may be a dielectric material or a metal material. Portions 2030 can be thin film, deposition, or coating. Each of beam equalizing portions 2030 are selected to have the appropriate balance of reflectivity and transmissivity to ensure the intensity of output beams 2051-2054 are substantially equal. Reflectivity is inversely proportional to transmissivity. That is, a 100% reflective material reflects 100% of the light, and 0% of the light can pass through. A 100% transmittance material allows 100% of the light to pass through, but no light is reflected. The balancing of the reflectivity/transmissivity ratios can be implemented as continuously variable change in reflectivity/transmissivity ratios or step-wise variable reflectivity/transmissivity ratios.

Beam injection portion 2020 can refer to the region in which input light beam 2040 initially interfaces with SSMB splitter 2000. In some embodiments, one of the beam equalizing portions 2030 may include injection portion 2020. In another embodiment, first planar surface 2010 may include injection portion 2020. In yet another embodiment, beam injection portion 2020 may be a channel designed to transmit light through a barrier that may otherwise completely reflect input beam away from SSMB splitter 2000. As a specific example, the injection site may be located on a mirror coated reflective surface. In order to pass input light beam 2040 into SSMB splitter 2000, beam injection portion 2000 can serve as the conduit for allowing light to pass through the mirror coated reflective surface.

SSMB splitter 2000 can be implemented in many different variations that include first planar surface 2010, transmission medium 2011, second planar surface 2012, beam injection portion 2020, and beam intensity equalizing portion(s) 2030. A few of these specific variations are now discussed.

In one embodiment, first planar surface 2010 can be constructed from a material that is partially reflective, which enables light to pass through and to be reflected. Second planar surface 2012 may be constructed from a material that is completely reflective, which reflects all light interfacing therewith. Transmission medium 2011 may be constructed from the same material as first planar surface 2010. Beam intensity equalizing portion(s) 2030 may be disposed on first surface 2010. Beam injection portion 2020 may be located on the same side as first surface 2010. Output beams 2051-2054 may exit out of the same side as first surface 2010.

Figure 21A:
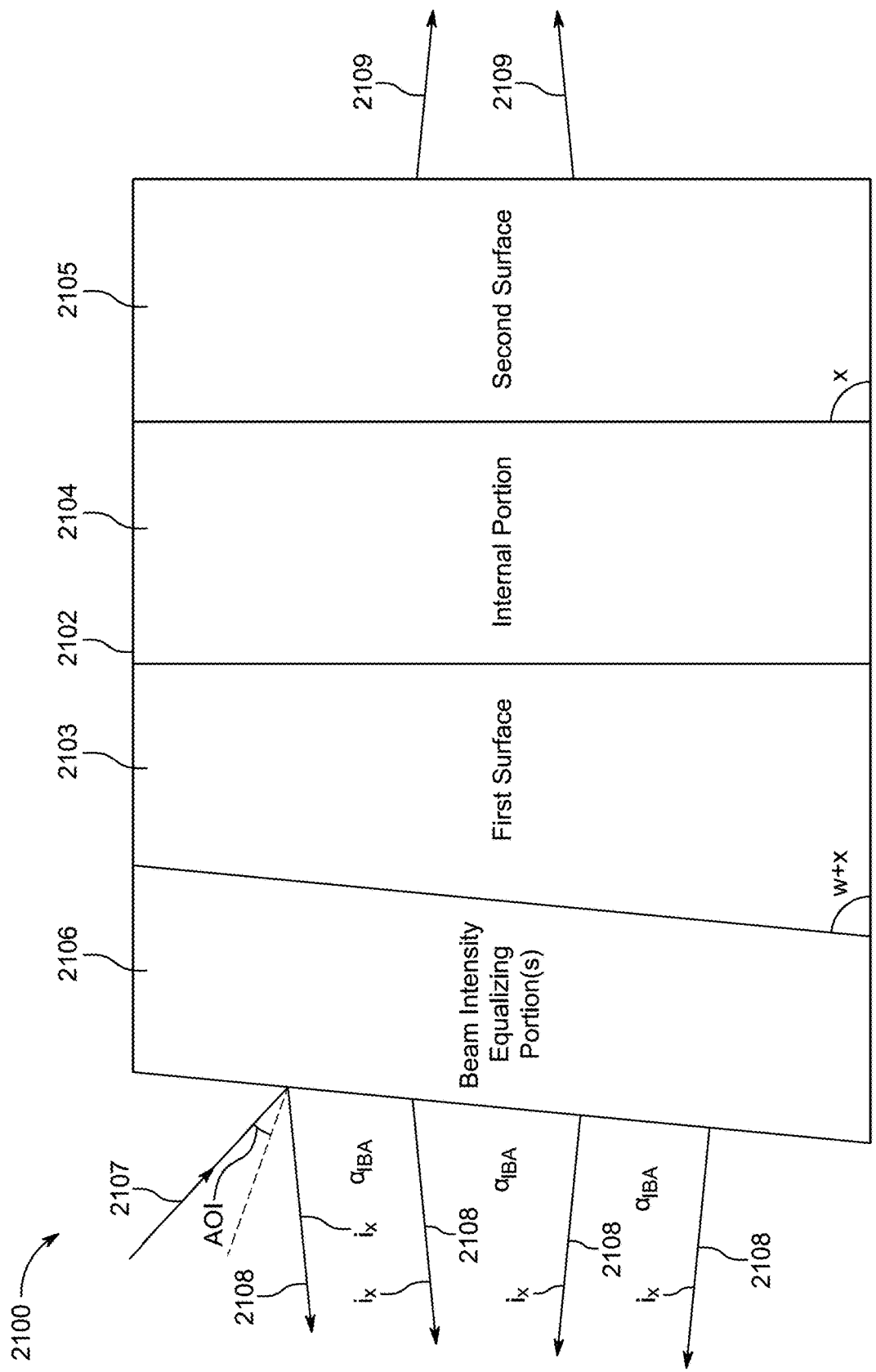
FIGS. 21A, 21B, and 21C show illustrative wedge splitters according to various embodiment.

FIG. 21A shows illustrative wedge splitter 2100 according to an embodiment. Wedge splitter 2100 can include prism structure 2102, which includes first surface 2103, internal portion 2104, and second surface 2105. First surface 2103 may have relative angle X+W, and second surface 2105 may have relative angle X, where W represents the wedge angle. Beam intensity equalizing portion 2106 may be applied to first surface 2103. Input beam 2107 may be injected into wedge splitter 2100 (at an AOI angle) via portion 2106 through first surface 2103. Output beams 2108 can exit out of splitter 2100 via first surface 2103 and portion 2106. In one embodiment, second surface 2105 may be coated with a mirror surface to reflect all light back to first surface 2103. In another embodiment, second surface 2105 can be partially reflective, to enable output beams 2109 to exit out of second side 2015 (as shown).

Figure 21B:
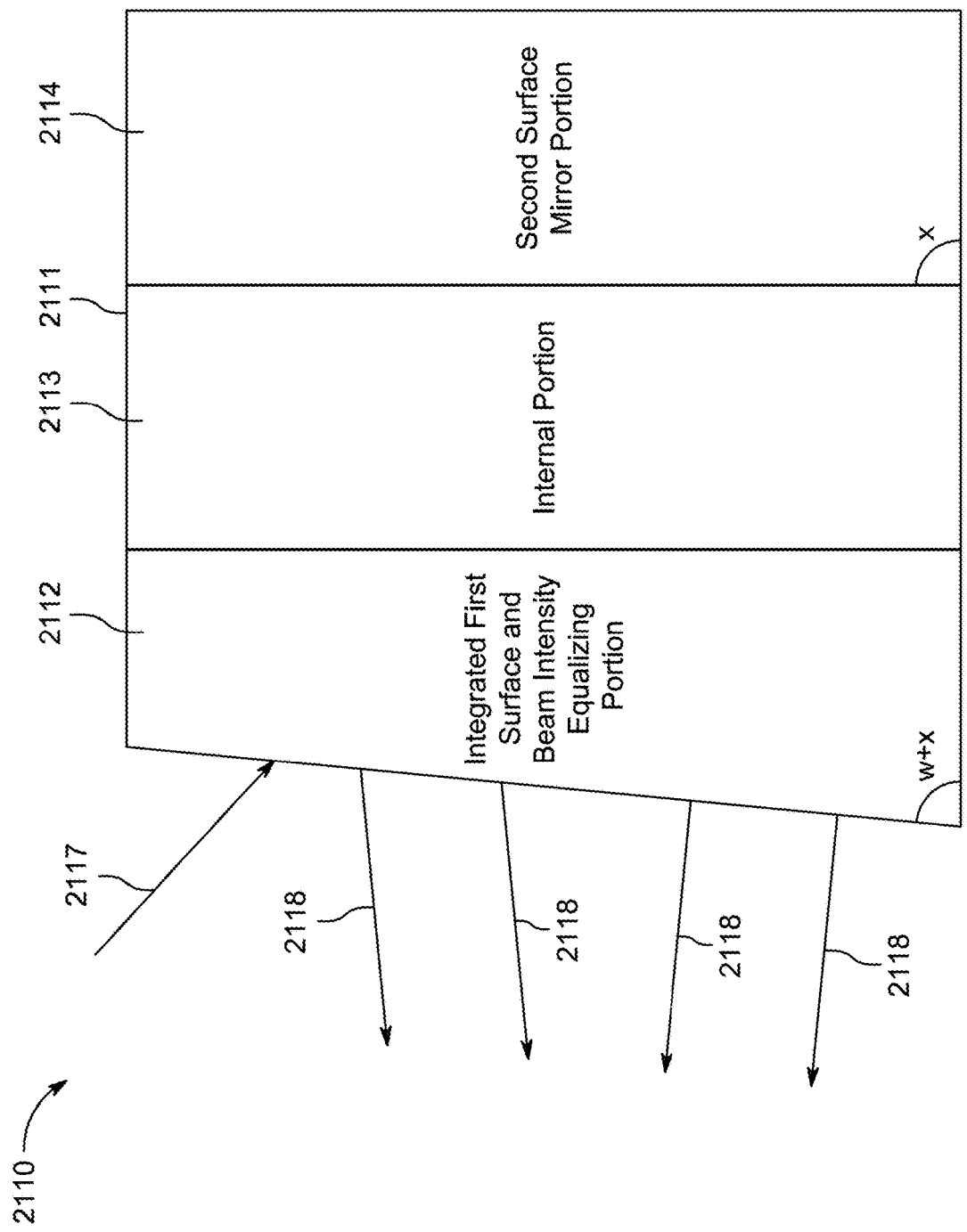

FIG. 21B shows illustrative wedge splitter 2110 according to an embodiment. Wedge splitter 2110. Wedge splitter 2110 can include prism structure 2111, which includes integrated first surface and beam intensity equalizing portion 2112, internal portion 2113, and second portion 2114. Wedge splitter 2110 is similar to wedge splitter 2100 of FIG. 21A, except that first surface and beam intensity portions are integrated. Integrated first surface and beam intensity equalizing portion 2112 may have relative angle, X+W. In this particular embodiment, the beam intensity equalizing portion may be responsible for wedge angle, W, of the first surface. Second surface 2114 may include a mirror portion (e.g., a mirror coating). Input beam 2117 enters wedge splitter 2110 and output beams 2118 exit out of portion 2112.

Figure 21C:
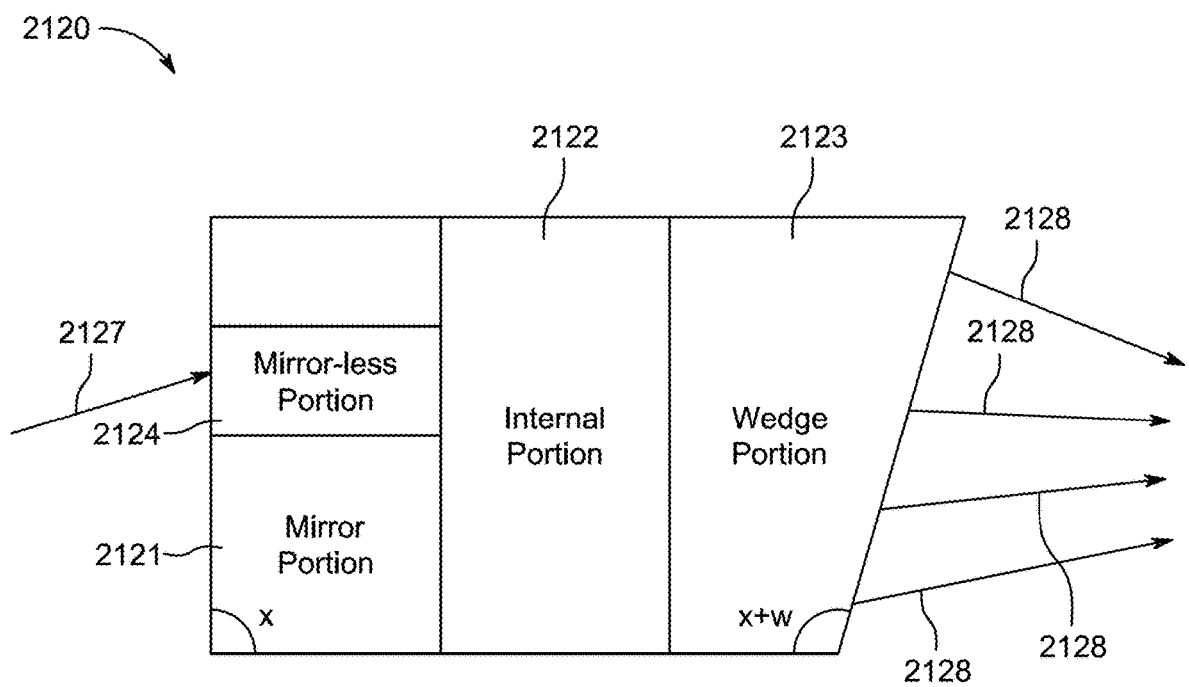

FIG. 21C shows illustrative wedge splitter 2120 according to an embodiment. Wedge splitter 2120 can include mirror portion 2121 (e.g., which is analogous to a first surface), internal portion 2122, wedge portion 2123 (e.g., which is analogous to a second surface), and mirror-less portion 2124. Mirror portion 2121 has relative angle, X, and wedge portion has relative angle X+W. Wedge splitter 2120 may have a prism structure. Mirror portion 2121 can be fully reflective, which prevents light penetration. Thus, mirror-less portion 2124 exists within mirror portion 2121 to allow input beam 2127 to enter wedge splitter 2120. Output beams 2128 exit out of wedge portion 2123. Note that in this embodiment, the input and output beams enter and exit on opposite sides of wedge splitter 2120.

FIGS. 22A and 22B show respective illustrative side and perspective views of wedge splitter 2200 according to an embodiment. In addition, FIGS. 22A and 22B show illustrative internal reflections of the light within wedge splitter 2200. Wedge splitter 2200 is a trapezoidal prism with first surface 2210, internal portion 2211, and second surface 2212. Beam equalizing portions 2213-2216 are shown to be disposed on first surface 2210 (in FIG. 22A but not in FIG. 22B). First surface 2210 is aligned at relative angle X+W, and second surface 2212 is aligned at relative angle X. The wedge angle, W, ensures that first and second surfaces 2210 and 2212 are not parallel. Input beam 2221 has an AOI angle and is injected into wedge splitter 2200 via equalizing portion 2213. A portion of input beam 2221 is reflected as output beam 2233 and another portion of input bam 2221 is transmitted through internal portion 2211 as internal beam 2223. Internal beam 2223 interacts with second surface 2212 and is reflected back towards first surface 2210 as internal beam 2224. A portion of internal beam 2224 exits wedge 2200 as output beam 2234 and a portion of internal beam 2224 is reflected back to second surface 2212 as internal beam 2225. Internal beam 2225 interacts with second surface 2212 and is reflected back towards first surface 2210 as internal beam 2226. A portion of internal beam 2226 exits wedge 2200 as output beam 2235 and a portion of internal beam 2226 is reflected back to second surface 2212 as internal beam 2227. Internal beam 2227 interacts with second surface 2212 and is reflected back towards first surface 2210 as internal beam 2228. A portion of internal beam 2228 exits wedge 2200 as output beam 2236.

Beam equalization portions 2213-2216 may be stepped coated into four separate bands or zones on surface 2210. Each portion 2213-2216 may be a dielectric multilayer. The dielectric may be an oxide layer that is deposited onto the prism substrate. Each portion 2213-2216 may occupy similar lengths along front surface 2210 (e.g., on the order of millimeters). Each portion 2213-2216 may be separated by the approximately same sized transition zones (e.g., on the order of microns). Each portion 2213-2216 may have different reflectivity/transmissivity ratios. For example, in one embodiment, portion 2213 may be 25% reflective, and 75% transmissive; portion 2214 maybe 66% reflective, and 34% transmissive; portion 2215 may be 50% reflective, and 50% transmissive; and portion 2216 maybe greater than 99.5% transmissive. It should be understood that that these ratios are merely illustrative and that any suitable ratios may be used to achieve substantially uniform beam intensity for all outgoing beams.

The AOI of input beam 2221 may be selected to ensure that output beams 2233-2236 converge at the same point at a fixed distance away from first surface 2210 (as shown, for example, in FIG. 19). For example, the AOI angle of input beam 2221 can range between 15 and 35 degrees, 17 and 32 degrees, or 20 and 30 degrees. The wedge angle, W, can be less than one degree. For example, the wedge angle, W, can range between 0.25 and 0.75 degrees, or 0.34 and 0.70 degrees.

Figure 22C:
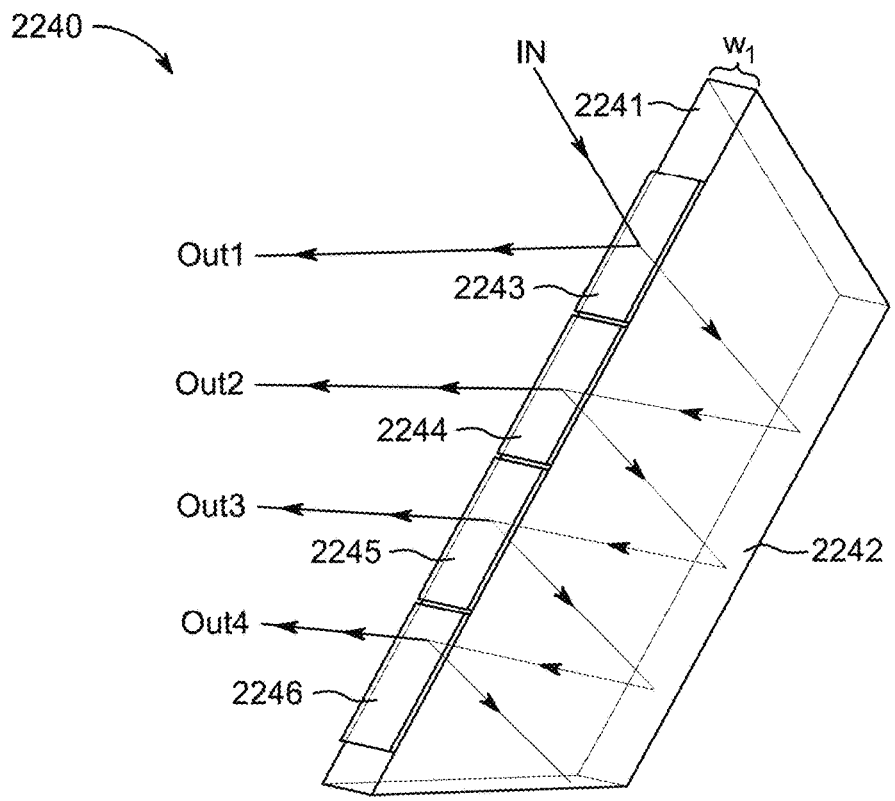
FIGS. 22C and 22D show illustrative perspective and side views of a wedge splitter according to an embodiment.
Figure 22D:
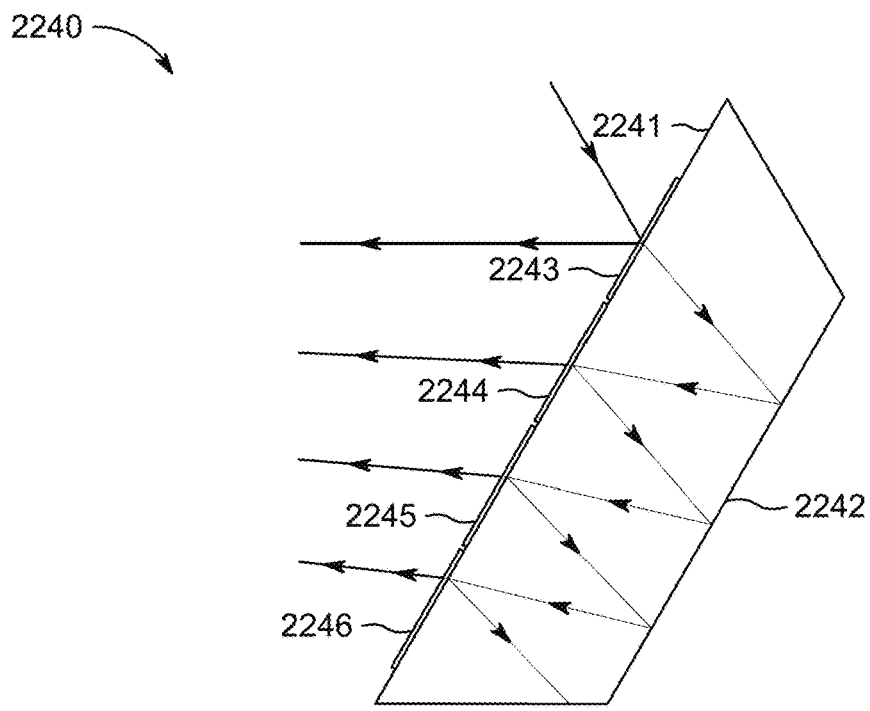

FIGS. 22C and 22D show illustrative perspective and side views of wedge splitter 2240 according to an embodiment. FIGS. 22C and 22D show illustrative internal reflections of the light within wedge splitter 2240 and output beams. Wedge splitter 2240 can be a trapezoidal prism with first surface 2241 and second surface 2242. Beam equalizing layers 2243-2246 are shown to be disposed on first surface 2241. The relative angles of first and second surfaces 2241 and 2242 may vary, for example, by a wedge angle of 0.35 degrees. Note that the prism has a thickness width, $W_1$. It should be understood that the thickness width may vary. Beam equalizing layers 2243-2246 may each occupy an equal amount of area on first surface 2241. Each of layers 2243-2246 may be separated by gaps (as shown). In some embodiments, layers 2243-2246 can cover the entire thickness width, or portion thereof, of first surface 2241.

Figure 22E:
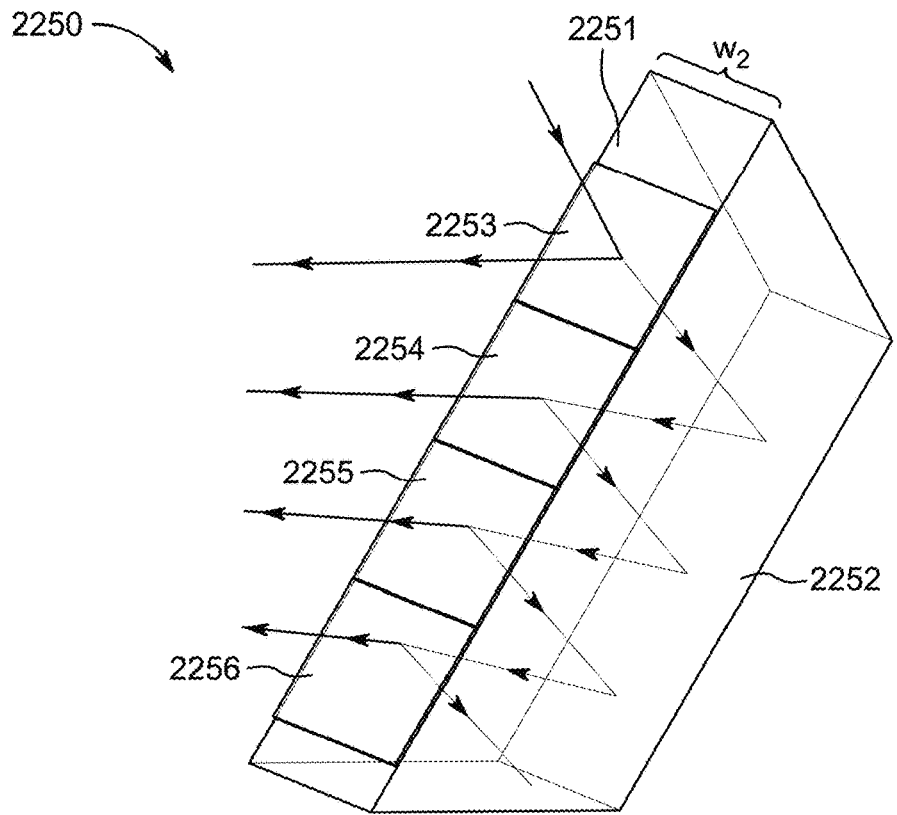
FIGS. 22E and 22F show illustrative perspective views of a wedge splitter according to an embodiment.
Figure 22F:
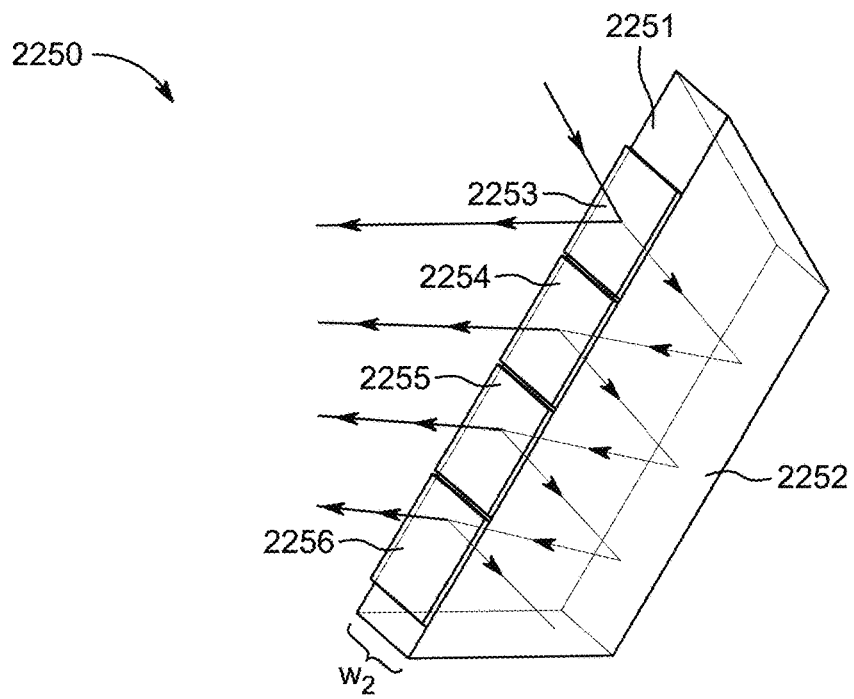

FIGS. 22E and 22F show illustrative perspective views of wedge splitter 2250 according to an embodiment. FIGS. 22E and 22F show illustrative internal reflections of the light within wedge splitter 2250 and output beams. Wedge splitter 2250 can be a trapezoidal prism with first surface 2251 and second surface 2252. Beam equalizing layers 2253-2256 are shown to be disposed on first surface 2251. The relative angles of first and second surfaces 2251 and 2252 may vary, for example, by a wedge angle of 0.7 degrees. Wedge splitter 2250 with a larger thickness width, $W_2$, which may be larger than the thickness width of wedge splitter 2240.

Figure 22G:
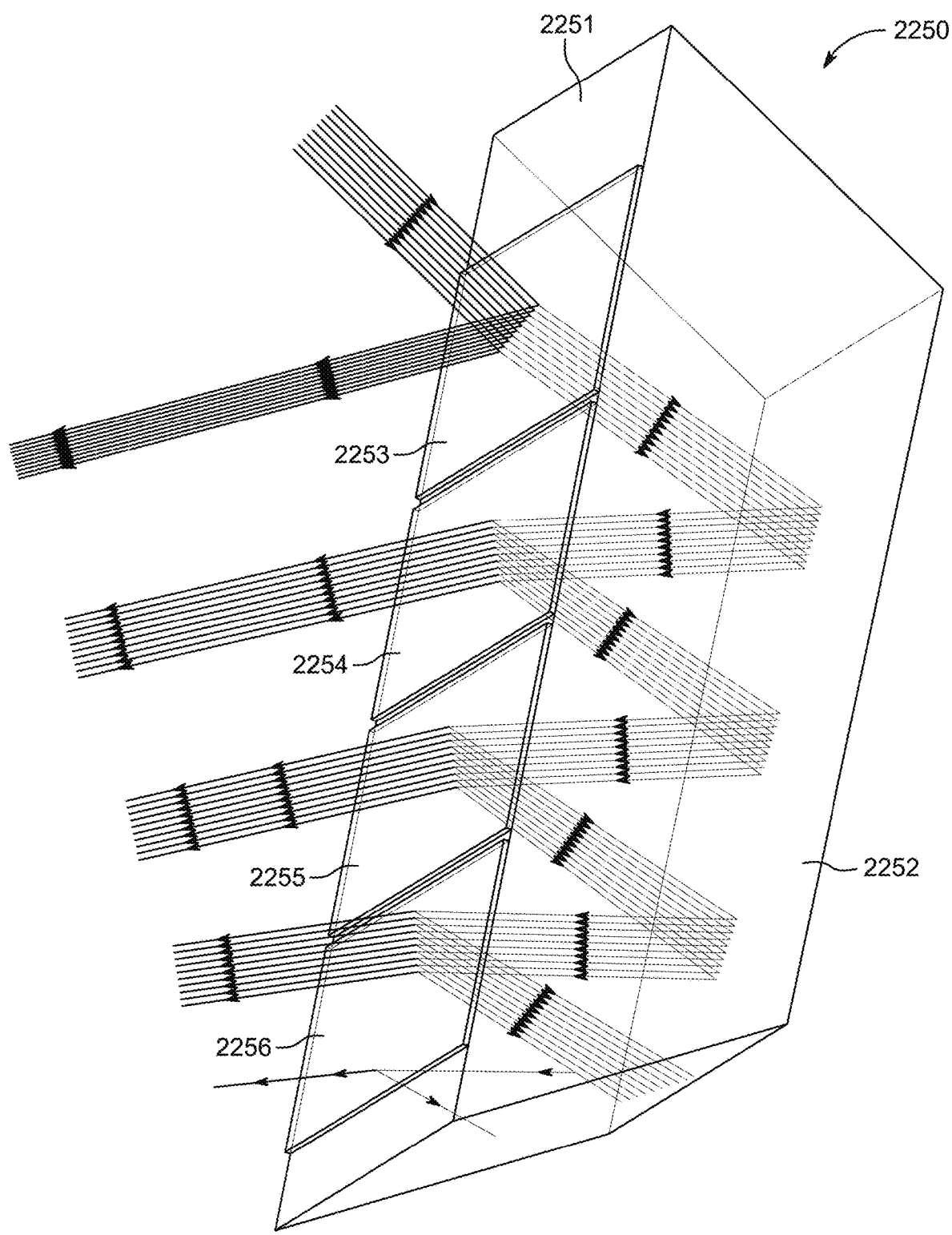
FIG. 22G show an alternative version of the wedge splitter of FIG. 22F according to an embodiment.

FIG. 22G shows another illustrative perspective views of wedge splitter 2250 according to an embodiment, but shows the input, reflected, and output light as a beam (as opposed to a single ray).

Figure 23:
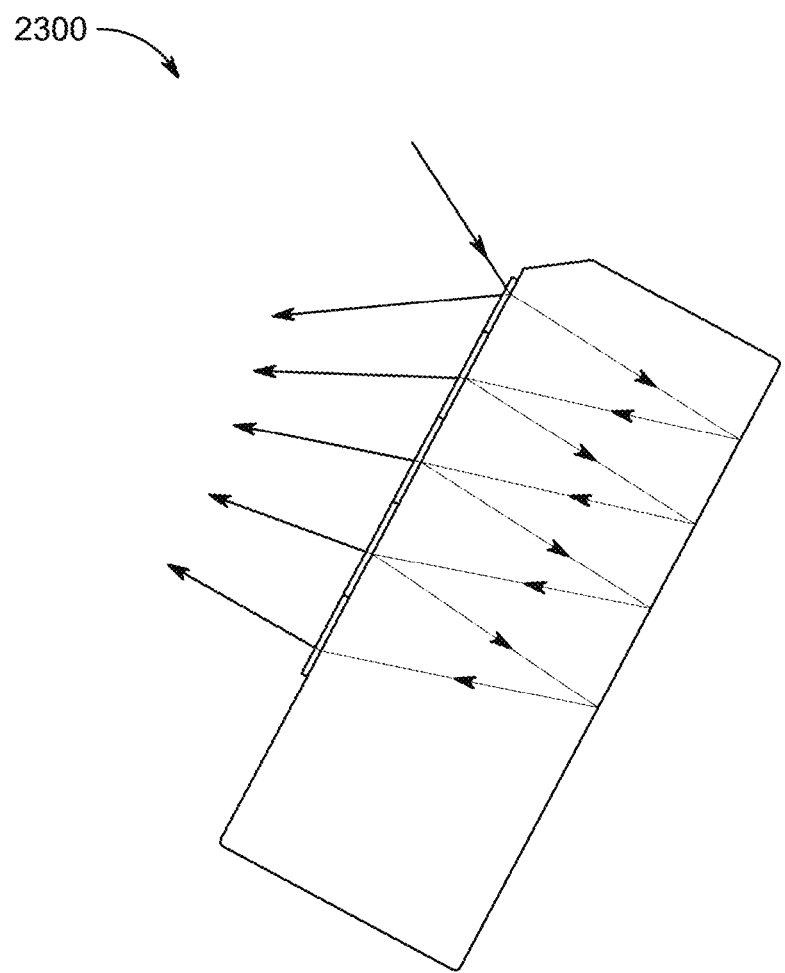
FIGS. 23, 24, and 25 show illustrative wedge splitter according to various embodiments.

FIG. 23 shows illustrative wedge splitter 2300 according to an embodiment. Wedge splitter 2300 is a trapezoidal prism that is similar to wedge splitter 2200, except it includes a chamfer edge 2350 and has five output beams. The input beam, internal reflection beams, and output beams are all illustrated.

Figure 24:
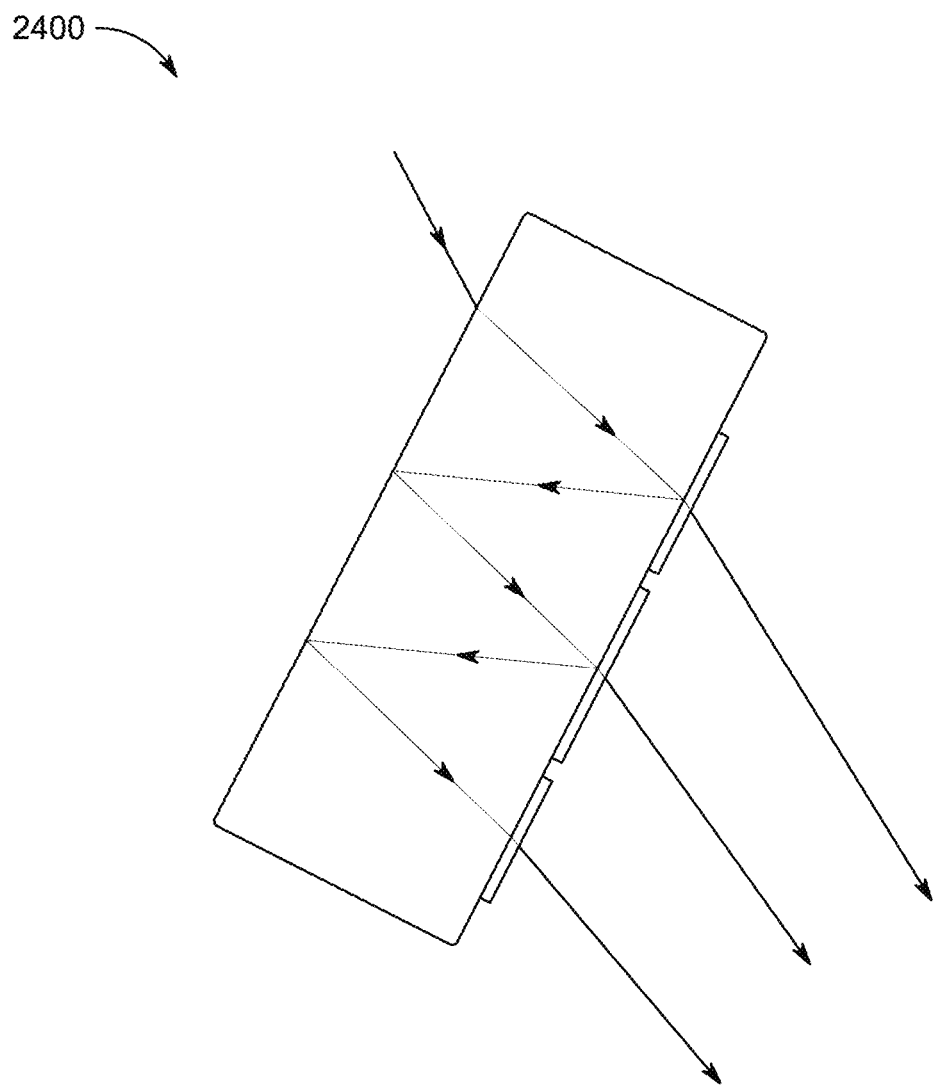

FIG. 24 shows illustrative wedge splitter 2400 according to an embodiment. Wedge splitter 2400 is a trapezoidal prism that is similar to wedge splitter 2200, except the input and output beams are on opposite sides and there are only three output beams. The input beam, internal reflection beams, and output beams are all illustrated.

Figure 25:
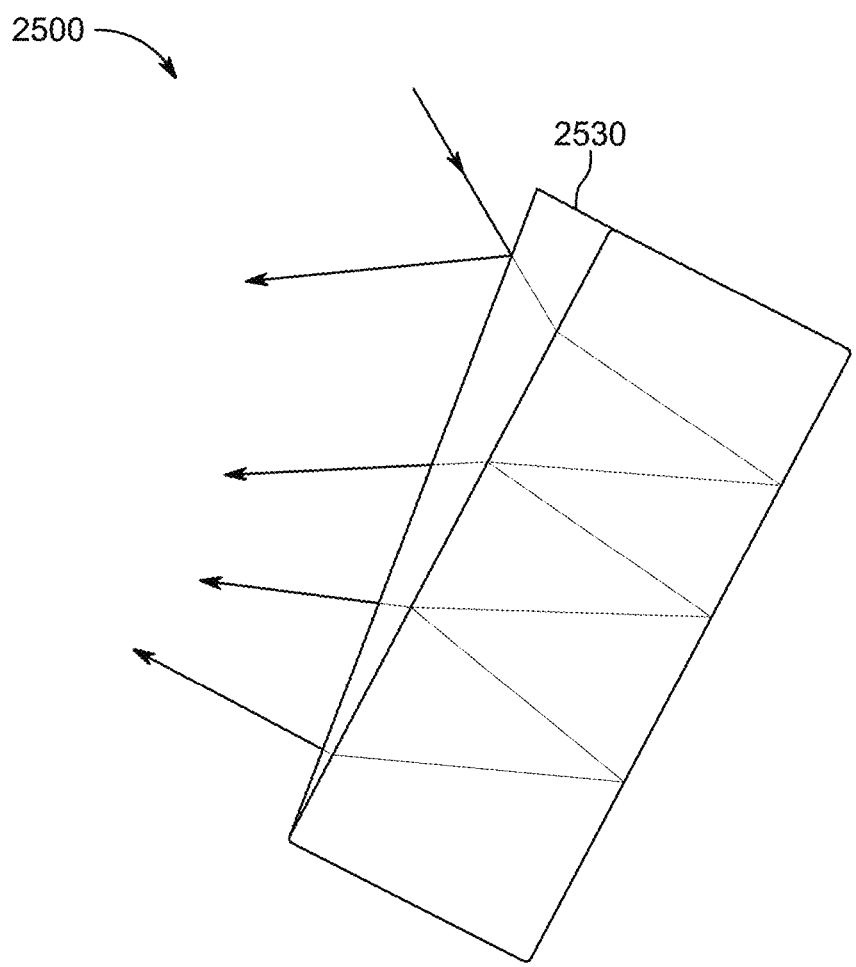

FIG. 25 shows illustrative wedge splitter 2500 according to an embodiment. Wedge splitter 2300 is a trapezoidal prism with a continuously variable equalization portion 2330. In this embodiment, equalization portion 2330 is deposited as a continuously variable medium that changes in thickness as a position along the surface of wedge splitter 2500. This is in contrast to the step-wise application of different thicknesses of the equalization portion as discussed above. The input beam, internal reflection beams, and output beams are all illustrated.

FIG. 26A shows illustrative SSMB splitter 2600 according to an embodiment. SSMB splitter 2600 uses a different approach than those discussed above in connection with FIGS. 21A, 21B, 21C, 22A, 22B, 22C, 22D, 22E, 22F, 22G, 23, 24, and 25 to generate multiple converging and substantially equal intensity output beams from a single beam source. SSMB splitter 2600 uses stacked splitter array 2610 in combination with faceted deflector 2630 to convert single input beam 2640 into multiple output beams 2651-2654. Laser source 2641 may emit a laser beam toward lens 2642, which can collimate the laser beam from laser source 2641 to stacked splitter array 2610. Stacked splitter array 2610 can include several prism structures 2651-2654 that are substantially perfectly aligned with each other such that each of interstitial beams 2121-2125 exit stacked splitter array 2610 at the same angle. For example, as shown, interstitial beams 2121-2125 exit stacked splitter array 2610 at 90 degrees. Arranging each of prism structures 2651-2654 to be stacked in the same orientation as each other is much easier to assemble than attempting to align the prism structures at different angles with respect to each other. Using this approach, faceted deflector 2630 is responsible for controlling the exit angle of output beams 2651-2654. Faceted deflector 2630 (also shown in close up in FIG. 26B) can include multiple facets 2631-2634. Facets 2631-2634 can control the exit angle of output beams 2651-2654 by redirecting interstitial beams 2621-2624 to the desired angle. Facet deflector 2630 may ensure that the inter-beam angle is the same for beams 2651-2654. In addition, facet deflector 2630 may ensure that beams 2651-2654 converge at the same point at a fixed distance away from SSMB splitter 2600.

Prism structures 2611-2614 may be coated with different reflectivity/transmissivity ratios to ensure that the intensity of output beams. Faceted deflector 2630 may be single piece construction or a multi-piece construction. Faceted deflector 2630 may be molded or machined or an assembly of four wedge splitters according to embodiments discussed herein.

Figure 27B:
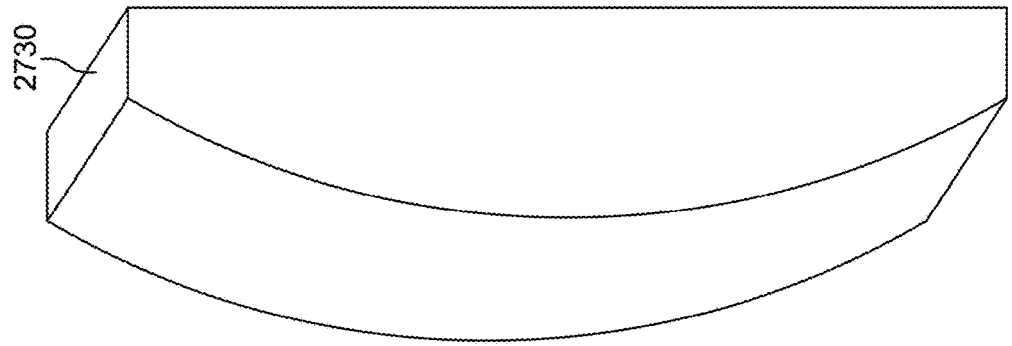
FIG. 27B shows illustrative faceted deflector according to an embodiment.
Figure 27A:
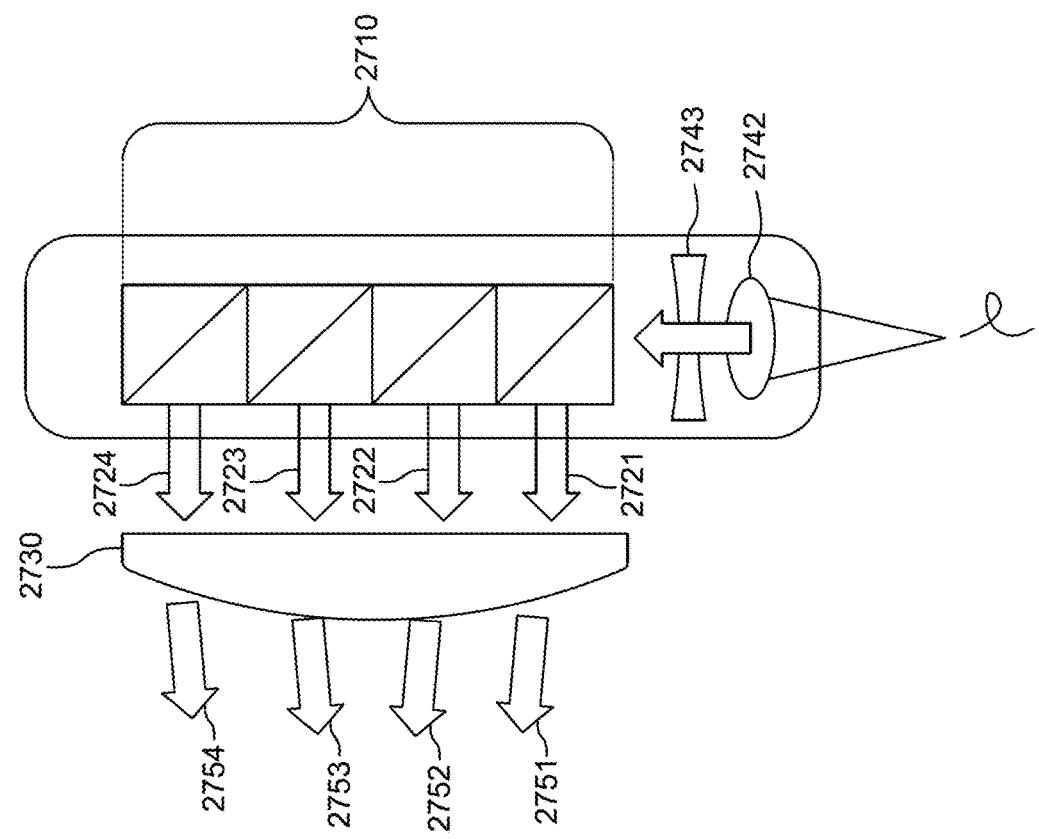
FIG. 27A shows illustrative splitter according to an embodiment.

FIG. 27A shows illustrative SSMB splitter 2700 according to an embodiment. SSMB splitter 2700 is similar to SSMB 2600, but adds divergence lens 2743 in the beam path between lens 2742 and stacked splitter array 2710. Divergence lens 2743 can be added to compensate for the convergence imposed on output beams 2751-2754 by faceted deflector 2730. That is, in some embodiments, a desired level of focus may be required at the focal length of SSMB splitter 2700. In some embodiments that do not use divergence lens 2743, output beams 2751-2754 may be more focused than desired. Hence, the addition of divergence lens 2743 can "pre" diverge interstitial beams 2721-2724 prior to be converged by faceted deflector 2730 so that the desired focus is achieved at the focal length. FIG. 27B shows a close up of faceted deflector 2730. Deflector 2730 can be a planoconvex (PCX) lens. This particular PCX lens can include a relatively smooth surface.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to all of the FIGS. as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A wedge splitter for use with a light detection and ranging (LiDAR) system, comprising:
    a prism structure comprising:
        a beam injection portion for receiving a light beam at an angle of incidence (AOI);
        a first planar surface arranged at a first relative angle; and a second planar surface arranged at a second relative angle that differs from the first relative angle by a wedge angle; and a plurality of beam intensity equalizing portions disposed on the prism structure, wherein the prism structure emits a plurality of output beams that are derived from the received light beam via the plurality of beam intensity equalizing portions, wherein the AOI and the wedge angle control an output angle of each of the plurality gf output beams such that each of the plurality of output beams converges at a common point in space a fixed distance away from the wedge splitter, and wherein each of the plurality of beam intensity equalizing portions controls a respective reflectivity/transmissivity ratio to ensure that each of the plurality of output beams has a substantially similar intensity.

2. The wedge splitter of claim 1, wherein the output angle of each of the plurality of output beams is such that an inter-beam angle between adjacent output beams of the plurality of output beams is the same.

3. The wedge splitter of claim 2, wherein the inter-beam angle is 1.12 degrees.

4. The wedge splitter of claim 3, wherein the plurality of output beams comprises four output beams.

5. The wedge splitter of claim 1, wherein the prism structure is a trapezoidal prism.

6. The wedge splitter of claim 1, wherein the second planar surface comprises a mirror coating.

7. The wedge splitter of claim 1, wherein each of the plurality of beam intensity equalizing portions comprises a dielectric layer or a metal layer.

8. The wedge splitter of claim 1, wherein the wedge angle ranges between 0.3 degrees and 0.7 degrees.

9. The wedge splitter of claim 1, wherein the first and second planar surfaces are not parallel.

10. A light detection and ranging (LiDAR) system, comprising:

a beam steering system comprising:
  a polygon structure; and
  a mirror coupled to a mirror controller that controls movement speed and direction of the mirror;

a laser subsystem comprising a laser source and a single source multiple beam (SSMB) splitter that produces a plurality of output beams that are steered by the beam steering system in accordance with a field of view (FOV), wherein the SSMB splitter comprising a prism structure, the prism structure comprising:
  a beam injection portion for receiving a light beam at an angle of incidence (AOI):
    a first planar surface arranged at a first relative angle; and
    a second planar surface arranged at a second relative angle that differs from the first relative angle by a wedge angle; and a plurality of beam intensity equalizing portions disposed on the prism structure,
  wherein the prism structure emits the plurality of output beams that are derived from the received light beam via the plurality of beam intensity equalizing portions, wherein the AOI and the wedge angle control an output angle of each of the plurality of output beams such that each of the plurality of output beams converges at a common point in space a fixed distance away from the SSMB splitter, and wherein each of the plurality of beam intensity equalizing portions controls a respective reflectivity/transmissivity ratio to ensure that each of the plurality of output beams has a substantially similar intensity; and a region of interest (ROI) controller coupled to the beam steering system and the laser subsystem, the ROI controller operative to:
  coordinate the movement speed of the mirror and light pulse intervals when the light pulses emitted by the laser system are steered to at least one ROI within the FOV.

11. The LiDAR system of claim 10, wherein the plurality of output beams have the same inter-beam angle.

12. The LiDAR system of claim 11, wherein the ROI controller is operative to control the mirror movement speed based on the inter-beam angle, a frame rate in which the beam steering system scans the FOV, and the at least one ROI.

13. The LiDAR system of claim 12, wherein the ROI controller is operative to control the mirror movement speed based on a desired angular resolution.

14. The LiDAR system of claim 11, wherein the SSMB splitter comprises a monolithic structure operative to receive the light beam as a single input beam and output the plurality of output beams by controlling an internal reflection path of the single input beam and output angles for each of the output beams such that the output beams have substantially the same beam intensity and convergence point.

15. The LiDAR system of claim 10, wherein the ROI controller is operative to:
  for light pulses steered towards the at least one ROI, control the movement speed of the mirror such that it is slower compared to the movement speed of the mirror when the light pulses are steered towards a non-ROI.

16. The LiDAR system of claim 10, wherein the ROI controller is operative to:
  adjust the movement speed of the mirror based on a beam steering angle within the FOV.

17. The LiDAR system of claim 10, wherein the ROI controller is operative to:
  adjust a repetition rate of the light pulses based on a beam steering angle.

* * * * *